(12) United States Patent
Adams et al.

(10) Patent No.: US 9,104,271 B1
(45) Date of Patent: Aug. 11, 2015

(54) GLOVED HUMAN-MACHINE INTERFACE

(76) Inventors: Richard Adams, Charlottesville, VA (US); Aaron Olowin, Charlottesville, VA (US); Blake Hannaford, Seattle, WA (US)

( * ) Notice: Subject to any disclaimer, the term of this patent is extended or adjusted under 35 U.S.C. 154(b) by 251 days.

(21) Appl. No.: 13/484,554

(22) Filed: May 31, 2012

Related U.S. Application Data

(60) Provisional application No. 61/492,886, filed on Jun. 3, 2011.

(51) Int. Cl.
  G06F 3/042 (2006.01)
  G06F 3/0488 (2013.01)
  G06F 3/01 (2006.01)

(52) U.S. Cl.
  CPC ............. *G06F 3/0426* (2013.01); *G06F 3/016* (2013.01); *G06F 3/04886* (2013.01); *G06F 3/017* (2013.01)

(58) Field of Classification Search
  USPC .................................................. 345/156–184
  See application file for complete search history.

(56) References Cited

U.S. PATENT DOCUMENTS

| | | | | |
|---|---|---|---|---|
| 5,581,484 A | * | 12/1996 | Prince | 702/150 |
| 6,312,398 B1 | * | 11/2001 | Cencer | 601/40 |
| 6,965,374 B2 | * | 11/2005 | Villet et al. | 345/169 |
| 2002/0118123 A1 | * | 8/2002 | Kim et al. | 341/34 |
| 2008/0055248 A1 | * | 3/2008 | Tremblay et al. | 345/158 |
| 2010/0134327 A1 | * | 6/2010 | Dinh et al. | 341/20 |
| 2011/0234483 A1 | * | 9/2011 | Lan et al. | 345/156 |
| 2012/0038582 A1 | * | 2/2012 | Grant | 345/174 |

OTHER PUBLICATIONS

Page, "NASA to Develop Haptic Air-typing Spacesuit Gloves", Nov. 26, 2009, 2 pages, http://www.theregister.co.uk/2009/11/26/spacesuit_glove_haptic_motion_sensing/.

* cited by examiner

*Primary Examiner* — Kumar Patel
*Assistant Examiner* — Amy C Onyekaba
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to: tracking movement of a gloved hand of a human; interpreting a gloved finger movement of the human; and/or in response to interpreting the gloved finger movement, providing feedback to the human.

34 Claims, 17 Drawing Sheets

GLOVED HUMAN-MACHINE INTERFACE

CROSS-REFERENCES TO RELATED APPLICATIONS

This application claims priority to U.S. Provisional Patent Application 61/492,886, filed 3 Jun. 2011.

STATEMENT OF GOVERNMENTAL SUPPORT

This invention was made with Government support under Contract No. NNX10CC92P1 awarded by the NASA Glenn Research Center. The Government has certain rights in the invention.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DRAWINGS

Figure 1:
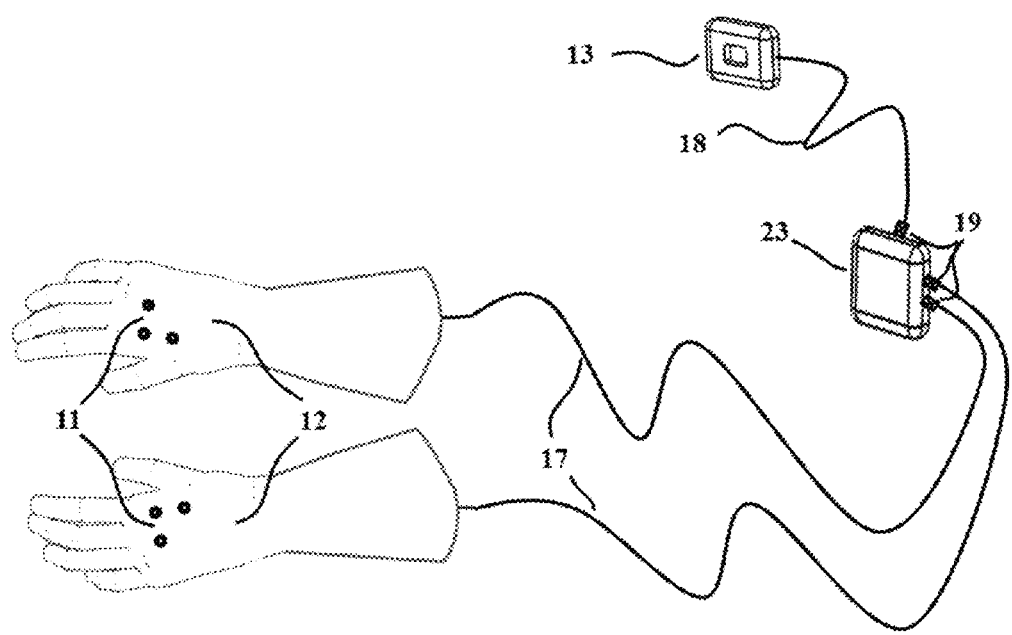
FIG. 1 is a perspective view of an exemplary human-machine interface constructed for use with both right and left hands.

Reference Numerals 11 light emitting diode
12 outer glove
13 camera
14 portable electronics
15 tactile actuation assembly
16 wiring harness
17 flexible cable
18 camera cable
19 external connector
20 flexion sensor
21 inner glove
23 computing system
24 microprocessor
25 vibrational motor
26 tactile adapter
27 flexible gasket
28 human finger
29 serial communications circuit
30 electrical power subsystem
31 programming connection
32 flexion sensor analog circuit
33 light emitting diode control circuit
34 vibrational motor control circuit
35 status indicators
36 hand position input
37 hand position tracking process
38 hand position data
39 system mode
40 mouse position data processing
41 mouse motion event data
42 graphical display
43 finger movement input
44 finger position tracking process
45 finger position data
46 mouse gesture recognition process
47 mouse button event data
48 tactile feedback processing
49 tactile feedback display
50 keyboard position data processing
51 finger to key mapping data
52 keyboard gesture recognition process
53 finger press data
54 keyboard event processing
55 key press event data
56 character display

DESCRIPTION

Certain exemplary embodiments can relate to human-machine interaction. More particularly, certain exemplary embodiments can relate to human-machine interaction for users wearing gloves on their hands for nearly any purpose. Example gloves can include environmental protective gloves such as those worn by astronauts, firefighters, deep-sea divers, bomb-disposal units, and/or hazardous material handling crew members. Other example gloves can include gloves worn to prevent contamination such as in semiconductor manufacturing, space hardware integration, and/or biological material handling. Typical gloves often can be bulky and/or can impede normal hand and/or finger motion, making it difficult or impossible to use a standard keyboard, mouse, and/or other human-machine interfaces.

In certain exemplary embodiments, a gloved human-machine interface can comprise protective outer gloves, inner gloves, vibrotactile actuators, a motion tracking camera, light emitting diodes, flexion sensors, portable electronics, data/power connections, a harness, and/or a computing system. Certain exemplary embodiments can allow a person to interact with a computer or other information device while wearing protective gloves, to enter numerical and/or textual data, to interact with a graphical user interface, to spatially designate points on a visual display (for navigation and/or annotation), and/or to generate tactile alerts and/or warnings. Certain exemplary allow a person to use protective gloves to replicate the functionality of a standard desktop mouse and/or keyboard.

Certain exemplary embodiments can replicate the familiar capabilities of standard desktop human interface devices and/or input devices (e.g., computer mouse and/or keyboard) using the protective gloves on an astronaut's hands as surrogates. Astronauts wearing space suits during extra-vehicular activity (EVA) currently have extremely limited access to mobile communications and computing. Certain exemplary embodiments can solve this problem by enabling the gloves on the crewmembers hands to be used as input devices. Certain exemplary embodiments can solve a similar problem for intra-vehicular activity (IVA), permitting crewmembers wearing protective gloves to access on-board data and/or communications systems. The ability to use the gloves for point-and-click (mouse-like) interactions and/or for text and/or numerical data entry (keyboard-like) interactions can enable a broad range of applications, including but not limited to: interaction with procedures or checklists, text communications, document browsing/editing, image annotation, cataloging of geological samples, navigation, voice and/or data communications, on-board systems control and/or monitoring, and/or robotic control.

Certain exemplary embodiments can permit protective gloves to be used as human-machine interface devices, allowing an operator in an environmental protection suit to perform keyboard and/or mouse interactions. Certain exemplary embodiments can use synergy between motion tracking, gesture recognition, and/or tactile feedback to create an intuitive human-machine interface that can emulate familiar desktop input devices.

Tactile feedback can be enabled by a unique concept that can use the pressurized gloves themselves as a transport mechanism for carrying tactile vibrations from motors to human fingertips.

Certain exemplary embodiments can combine any of three elements to recreate the functionality of a standard desktop computing mouse and/or keyboard using the gloves on a suited operator's hands: motion tracking, finger gesture recognition, and/or tactile feedback.

Certain exemplary embodiments can operate in two modes: MOUSE and KEYBOARD. In MOUSE mode, certain exemplary embodiments can emulate the functionality of a computer mouse. Hand motion, through the motion tracking element, can permit left or right hand position to drive the movement of a cursor on a visual display in the same manner as a computer mouse. Finger tapping motions from one or more fingers can be recognized by the finger gesture recognition element and/or translated into mouse click events. Tactile feedback in one or more fingers can provide the physical sensation of button clicks, the edges of windows, and/or other graphical user interface (GUI) interactions. In addition to general GUI interactions, MOUSE mode can permit text and/or data entry using an on-screen virtual keyboard through a "hunt-and-peck" approach using cursor movement and/or mouse clicks to tap keys.

In KEYBOARD mode, certain exemplary embodiments can emulate the functionality of a standard QWERTY keyboard (or any other computer keyboard and/or numeric keypad). Hand motion, through the motion tracking element, can control the mapping from the fingers on right and/or left hands to keys on a virtual keyboard. When KEYBOARD mode is initialized, the fingers on the left hand can map (from pinky to index) to "a," "s," "d," "f" and/or the fingers on the right hand can map to "j," "k," "l," ";". Through the motion tracking element, translation of hand position can change the mapping to mimic the change of finger position on a physical keyboard. A forward motion with the left hand can change the mapping so that the index finger rests on the "r" key. Finger tapping motions with any finger can generate a keyboard stroke of the appropriate key. Tactile feedback can provide the physical sensation of button clicks and/or a physical "bump" feel to the transition between hand positions on the keyboard.

In certain exemplary embodiments, hand motion tracking can be used to map hand position to a single key on a virtual keyboard. In this form, a finger tap from any finger on that hand can result in that key being registered. Thus a glove with only a single flexion sensor and single tactile assembly can be used in KEYBOARD mode.

The constraints of a protective suit can make conventional modes of human-machine interaction difficult. In mobile environments, standard I/O approaches such as a physical keyboard, mouse, and large liquid crystal displays (LCDs) can be unavailable. While adaptations of smaller LCDs and keyboards used in state-of-the-art Personal Digital Assistants (PDAs) and smart phones are possible, they have not proven to be practical when a human is wearing protective gloves. Restrictions imposed by the space suit glove, or other bulky gloves, make interacting with a small keyboard, either a physical keypad or virtual (touch screen), impractical.

Introducing tactility into a data entry system can increase crewmember performance and/or reduce mental workload. Certain information displays can overly rely on visual rendering, taxing cognitive resources already heavily burdened by the operational environment. The resulting information overload can result in poor multi-tasking efficiency, poor task performance, and/or increased frequency of errors. Through the synergistic combination of motion tracking, finger gesture recognition, and/or tactile feedback, certain exemplary embodiments can enable the kind of heads-up operation touch typists use to efficiently key text. Tactile features can introduce physical sensations to increase throughput, reduce errors, and/or increase user satisfaction.

Certain exemplary embodiments can place all components requiring electrical current outside of a pressure layer of a protective glove. Placement of all components requiring electrical current outside of this layer of the glove can avoids penetrations through the pressure layer that would require a leaky, or failure prone, seal. The pressure layer can comprise electrically insulating material. Placement of current-carrying components outside of this layer can prevent a shock hazard due to the introduction of current-carrying components into the glove. Furthermore, placement of components outside of the pressure layer can prevent a fire hazard due to introduction of potentially spark-generating electronics into the highly oxygenated environment within a protective suit.

Certain exemplary embodiments of a human-machine interface for glove-wearing humans can be constructed as shown in FIG. 1. Any number of light-emitting diodes 11 can be integrated into the back of either and/or each of two outer gloves 12. A flexible connector 17 can communicatively couple internal glove electronics (shown in FIG. 2 and described below) to an external connector 19, thereby providing a communications linkage to a computing system 23. A camera 13 (such as the FLEX:V100 available from NaturalPoint, Inc. of Corvallis, Oreg.) can comprise a sensor, signal processing electronics, and/or optics housed within an enclosure. The camera 13 can be operatively attached to a user's torso (for example on the outside of a space suit), adjacent to the user's head (for example next to the helmet of a space suit), or in any other location that provides visibility to the user's hands. A camera cable 18 can communicatively couple the camera to an external connector 19, thereby providing a communications linkage to a computing system 23. The computing system 23 can encompass a processor, digital data input and/or output, and/or a power supply. Computing system 23 in turn can be connected to, or encompassed within, additional computing, communications, and/or other user interface elements, such as a heads-up visual display, that are specific to particular uses of certain exemplary embodiments.

Figure 2:
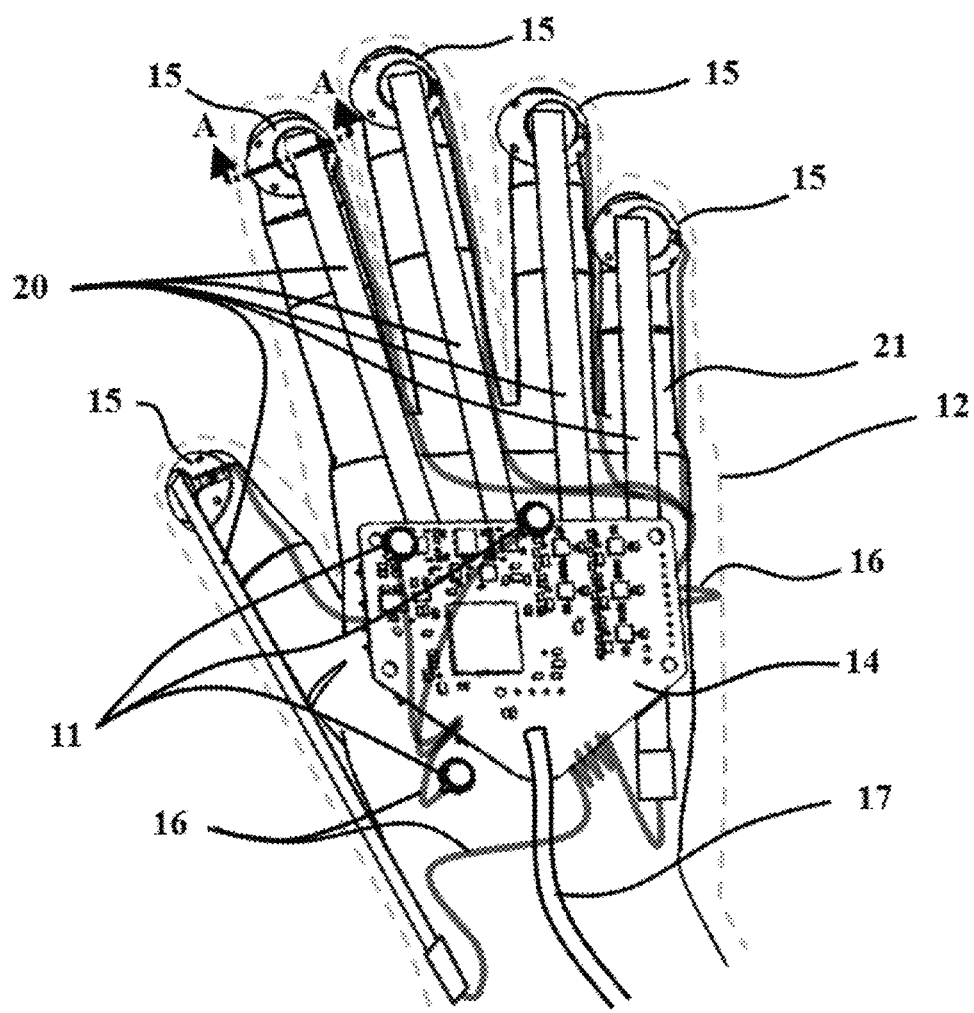
FIG. 2 is a perspective view showing the interior of the exemplary right hand glove of FIG. 1.

FIG. 2 shows a perspective view of the interior of the exemplary right hand glove of FIG. 1. An inner glove 21, which can be enclosed by the outer glove 12, can be fabricated from multiple layers which can include a pressure layer comprising a substantially gas-impermeable material (such as urethane or latex) and/or a layer of restraint material (such as synthetic polyester fabric). Right and left hand gloves can be constructed in a like manner. Tactile actuation assemblies 15, each of which can comprise a vibrational motor and/or a tactile adapter (shown in FIG. 5 and described below), can be operatively attached to the inner glove 21 aligned with any and/or each finger, and/or can be held in position by stitching, sandwiched layers of glove fabric, adhesive, and/or by any other means. The tactile actuation assemblies 15 can connect to a wiring harness 16. The wiring harness 16 can connect to leads on portable electronics 14 to the tactile actuation assemblies 15, light-emitting diodes 11, and/or flexion sensors 20. The wiring harness 16 can be fabricated from insulated wire and/or flexible circuit material and/or can be routed within the fabric of the outer glove 12. Flexion sensors 20 can be placed within the outer glove 12 aligned with any and/or each finger, and/or can be held in position by a fabric sleeve, sandwiched layers of glove fabric, and/or flexible tubing. The flexion sensors 20 can comprise a carbon/polymer based ink (available from Flexpoint Sensor Systems of Draper, Utah) and/or similar material that can vary in resistance when flexed (and thus can serve as a finger bend sensor). Light-emitting diodes 11 (for example 850 nm high-efficiency, wide angle LEDs) can be integrated into the outer glove 12 such that they protrude through the outer glove, or are provided with a substantially transparent window or cover, in a manner that makes them visible to the camera. The portable electronics 14 comprises a microprocessor, signal conditioning/amplification, analog-to-digital conversion, pulse-width modulation, analog logic circuitry, digital input/output, energy storage, power conditioning, and/or tactor driver circuitry integrated on a printed circuit board. A flexible cable 17 can communicatively connect the portable electronics to a glove connector 19, thereby providing a communications and/or power linkage to the computing system 23 shown in FIG. 1. The flexible cable 17 can thus carry electrical power, commands to tactile actuators, mode change commands, light emitting diode flashing and/or dimming commands, and/or any other information or commands from the computing system 23 to portable electronics 14, and/or carry event messages, diagnostic messages, sensor data messages, and/or any other information from the portable electronics 14 to the computing system 23. FIG. 2 also identifies the sectional view "A-A" cut plane for FIG. 9.

Figure 3:
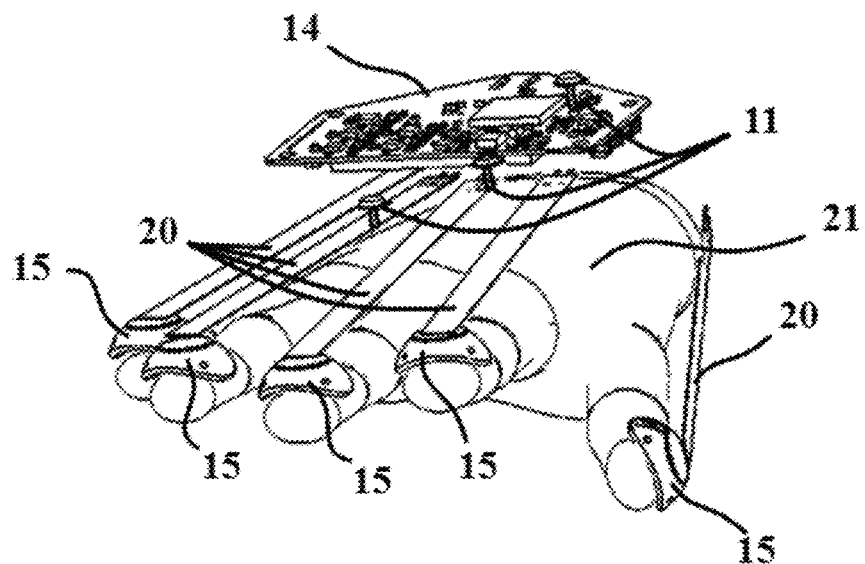
FIG. 3 shows an exemplary relative placement of the electronic components of the exemplary right hand glove of FIG. 1 with respect to the inner glove.

FIG. 3 shows a perspective view of the exemplary embodiment shown in FIG. 2, illustrating the inner glove 21 and placement of glove components with the outer glove, flexible cable, and wiring harness omitted.

Figure 4:
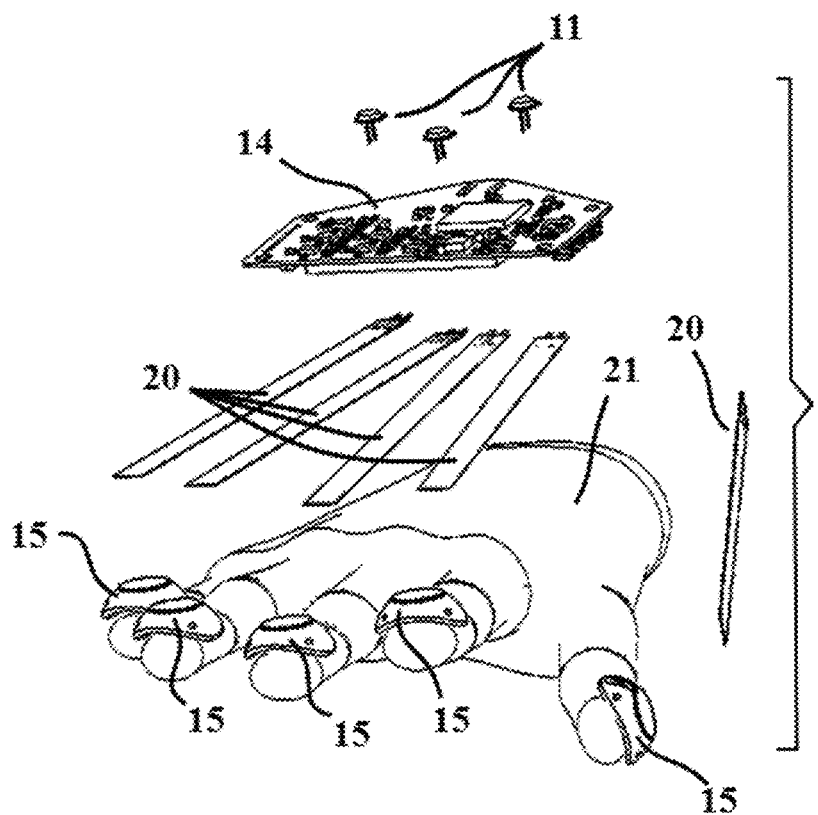
FIG. 4 shows an exploded view of FIG. 3.

FIG. 4 shows an exploded view of the exemplary embodiments shown in FIG. 3, and showing placement of exemplary glove components with the outer glove, flexible cable, and wiring harness omitted.

Figure 5:
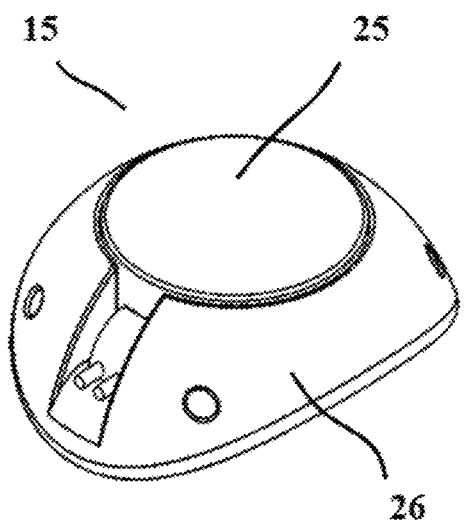
FIG. 5 shows an exemplary tactile actuation assembly.

FIG. 5 shows a perspective view of an exemplary embodiment of a tactile actuation assembly 15, which can comprise a vibrational motor 25 and/or a tactile adapter 26. The tactile adapter 26 can be fabricated from plastic, rubber, metal, or any other suitable material. The vibrational motors 25 can be linear resonant actuators (available from Precision Microdrives Limited, London, UK), eccentric rotating mass motors (available from Precision Microdrives Limited, London, UK), plunger-type linear electro-magnetic motors (available from Engineering Acoustics Inc. of Casselberry, Fla.), piezoelectric actuators, electro-active polymer actuators, voice-coil actuators, or any other motor type that generates sufficient vibrational energy in a suitably small form factor. The tactile adapter 26 can have any number, or no, holes to permit the adapter to be operatively attached to the inner glove through stitching.

Figure 6:
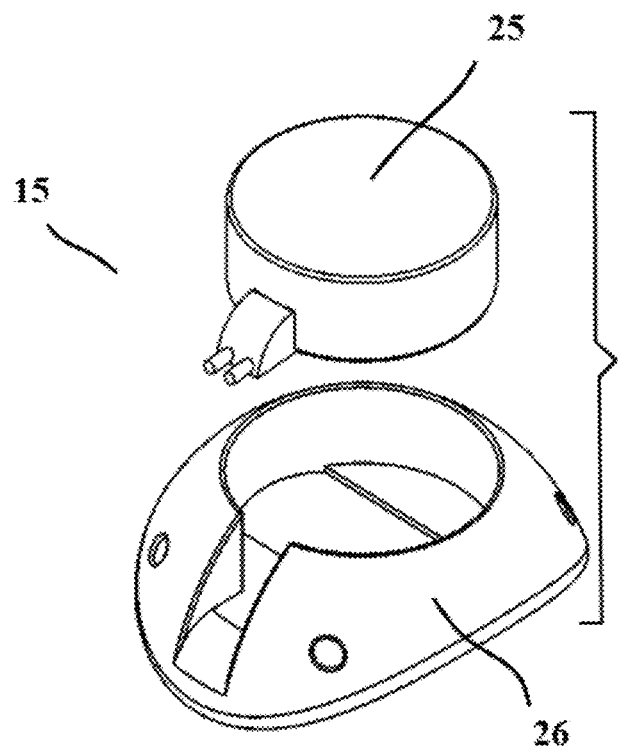
FIG. 6 shows an exploded view of FIG. 5.

FIG. 6 shows an exploded view of FIG. 5.

Figure 7:
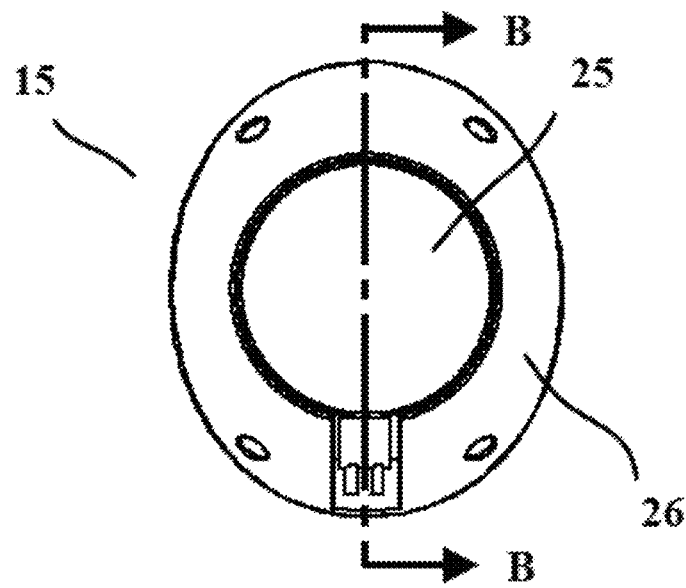
FIG. 7 shows a top view of an exemplary tactile actuation assembly.

FIG. 7 shows a top view of an exemplary tactile actuation assembly 15.

Figure 8:
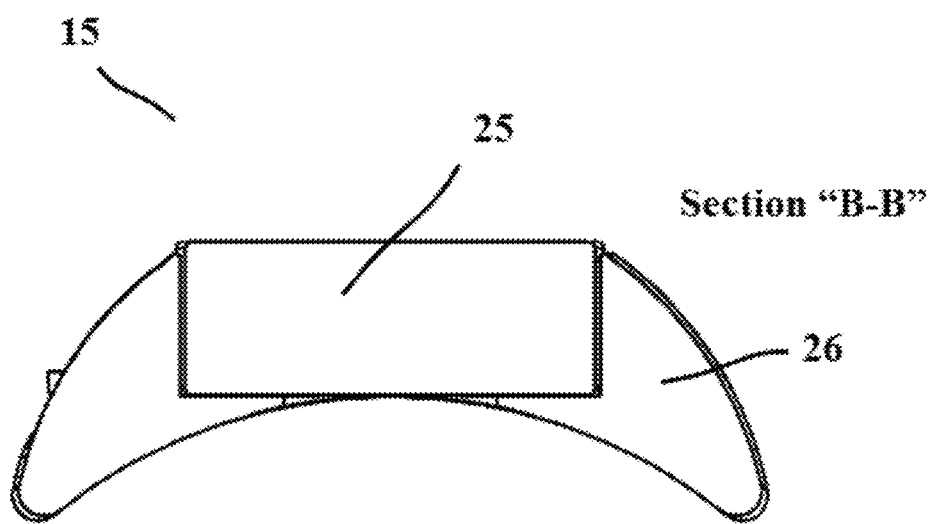
FIG. 8 shows a section view of an exemplary tactile actuation assembly taken at section B-B of FIG. 7.

FIG. 8 shows a section view taken at section B-B of FIG. 7 of an exemplary tactile actuation assembly 15. In certain exemplary embodiments, a linear resonant actuator type vibrational motor 25 can be held rigidly within a tactile adapter 26. In certain exemplary embodiments, the tactile adapter 26 can be fabricated such that a vibrational motor 25 is in direct contact with the inner glove to which the adapter can be operatively attached by stitching, sandwiched layers of glove fabric, adhesive, and/or by any other means.

Figure 9:
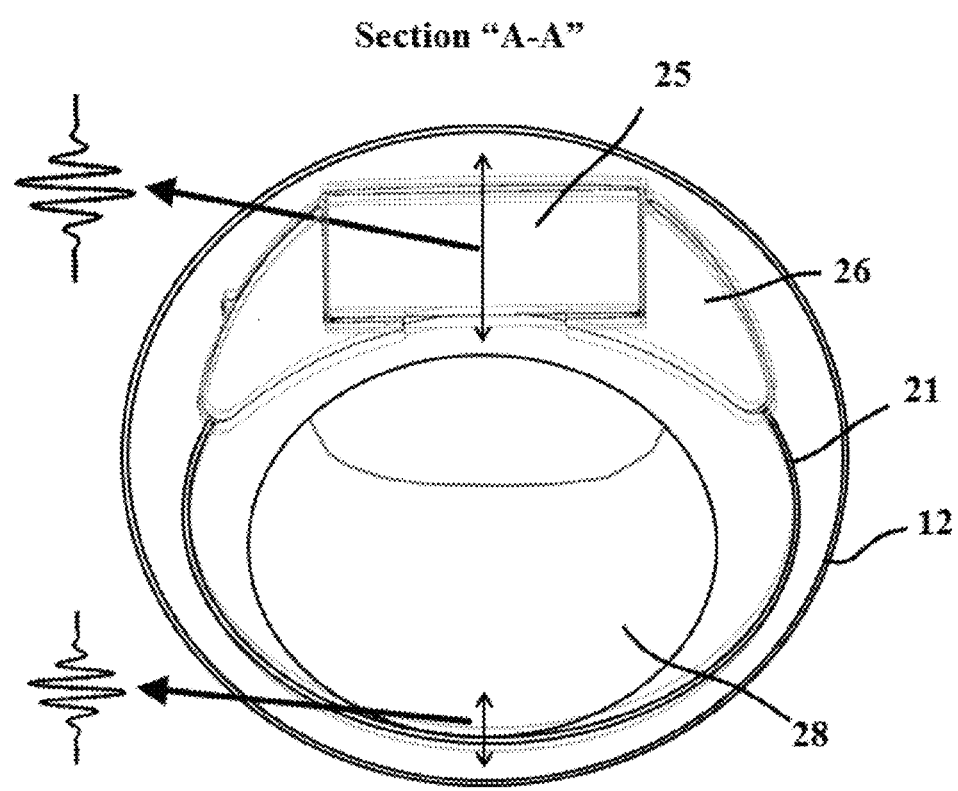
FIG. 9 shows a section view taken at section "A-A" of FIG. 2, and illustrates exemplary vibrational motion in an exemplary tactile actuation assembly and an exemplary inner glove.

FIG. 9 shows a section view taken at section "A-A" of FIG. 2. In certain exemplary embodiments, such as a space suit, the gas within the pressure layer of the inner glove 21 can be maintained at a positive pressure differential with respect to the atmospheric pressure of the outside environment. In such cases, the inner glove layers can become stiffened, similar to the surface of an inflated balloon. As a result, the inner glove material can become an efficient carrier of mechanical vibrations. The tactile adapter 26 can be operatively attached to the fabric of the inner glove 21 such that vibrations in the tactile adapter result in oscillatory motion in the inner glove 21. An amplitude-modulated drive voltage can be applied to the motor from the portable electronics 14 through the wiring harness 16. The resulting oscillatory forces in the vibrational motor 25 can be applied through the tactile adapter 26 to the material of the inner glove 21, causing physical vibrations (oscillatory displacements). The pressure stiffened inner glove material can carry these vibrations to the human finger 28 inside of the glove, creating a perceptible tactile sensation.

Figure 10:
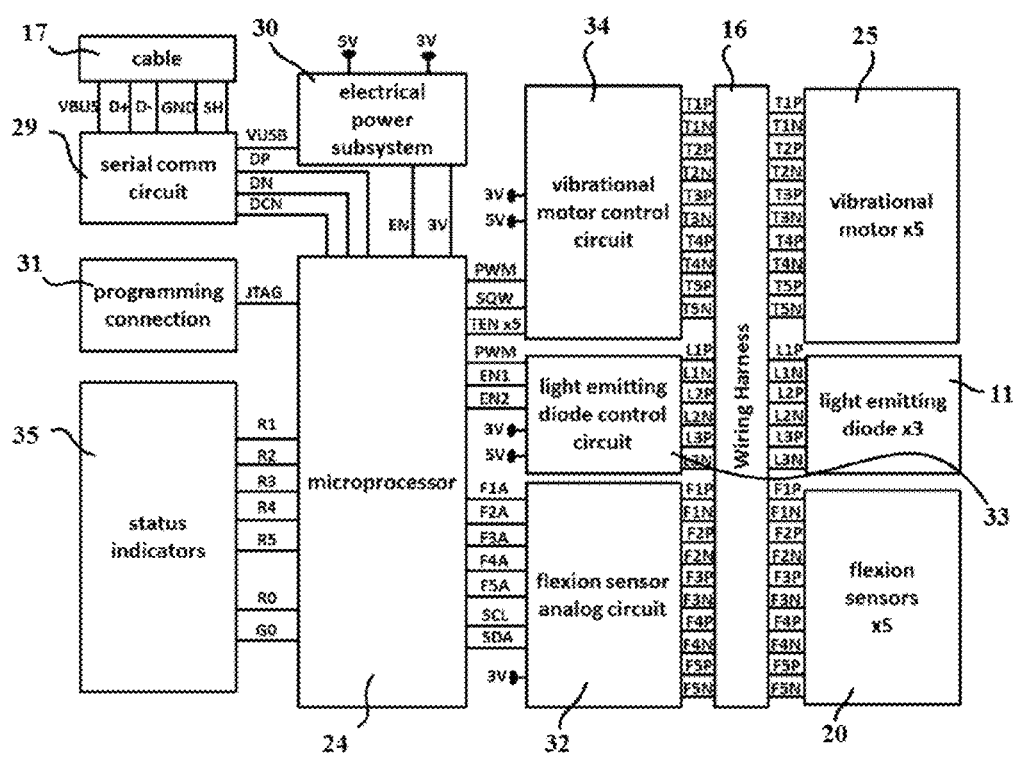
FIG. 10 shows a diagram of electronic components in an exemplary embodiment.

FIG. 10 is a block diagram of exemplary major components of an exemplary embodiment of the portable electronics 14 and its connection, through the wiring harness 16, to the vibrational motors 25, the light emitting diodes 11, and the flexion sensors 20. The exemplary embodiment of the portable electronics can comprise a microprocessor 24, a serial communications circuit 29, an electrical power subsystem 30, a programming connection 31, a flexion sensor analog circuit 32, a light emitting diode control circuit 33, a vibrational motor control circuit 34, and/or status indicators 35.

An exemplary embodiment of a vibrational motor control circuit 34 can receive 3 volt regulated power and/or 5 volt unregulated power from the electrical power subsystem 30, potentially along with a pulse width modulated (PWM) signal, a square wave (SQW) clock signal, and/or five digital tactor enable (TEN) signals from the microprocessor 24. The PWM and/or SQW signals can be passed through an exclusive OR logic gate to provide a modified PWM that has a duty cycle that changes at the frequency of the SQW clock. The modified PWM signal can be provided to each of five vibrational motor driver chips (for example, the DRV8601 from Texas Instruments, Dallas, Tex.) potentially along with the five tactor enable (TEN) signals, which can enable the microprocessor 24 to activate any number or all of the vibrational motors 25. Wires within the wiring harness 16 can provide positive and/or negative leads connecting the vibrational motor control circuit 34 to the vibrational motors 25.

An exemplary embodiment of a light emitting diode control circuit 33 can receive 3 volt regulated power and/or 5 volt unregulated power from the electrical power subsystem 30, potentially along with a pulse width modulated (PWM) signal and/or two enable signals (EN1, EN2) from the microprocessor 24. The enable signals and/or the PWM signal can provide on/off and/or continuous dimming of the light emitting diodes 11 through an integrated circuit light emitting diode driver (for example, the LTC3453EUF from Linear Technology, Milpitas, Calif.). Six wires within the wiring harness 16 can provide positive and/or negative leads connecting the light emitting diode control circuit 33 to the light emitting diodes 11.

An exemplary embodiment of a flexion sensor analog circuit 32 can receive 3 volt regulated power from the electrical power subsystem 30, and/or a clock (SCL) signal and/or a data (SDA) signal from the microprocessor 24. The flexion sensor analog circuit 32 can contain five amplification circuits, each of which can comprise an operational amplifier, a digital potentiometer (for example, the MAX5479 from Maxim Incorporated, Sunnyvale, Calif.), resistors, and/or capacitors. The amplification circuits can generate a voltage that can vary when finger motion causes bending, and thus a change of resistance, in the flexion sensors 20. The SCL and/or SDA signals from an inter-integrated circuit (I2C) interface channel on the microprocessor 24 can adjust the resistance provided by each of the five digital potentiometers, and thus regulate the calibration (bias) voltage on the output of each amplification circuit. An analog-to-digital converter within the microprocessor 24 can receive the analog output voltage of each amplification circuit (F1A, F2A, F3A, F4A, and/or F5A). Ten wires within the wiring harness 16 can provide positive and/or negative leads connecting the flexion sensor analog circuit 32 to the flexion sensors 20.

An exemplary embodiment of an electrical power subsystem 30 can receive 5 volt power (VUSB) from a serial communications circuit 29 and/or an enable (EN) signal from the microprocessor 24. A super-capacitor (for example, the HS203F from Tecate Group, San Diego, Calif.) can provide electrical energy storage to permit the vibrational motor control circuit 34 to temporarily consume more than the steady state power available from VUSB, thus permitting a wider range of tactile effects. The super-capacitor can be controlled by a super-capacitor charger integrated circuit (for example, the LTC4425 from Linear Technology, Milpitas, Calif.), which can receive external power from VUSB and/or its enable (EN) signal from the microprocessor 24. The electrical power subsystem 30 can include a low-dropout regulator (for example, the TLV70033DCKT from Texas Instruments, Dallas, Tex.) to provide stable 3 volt power to other components in the portable electronics 14.

An exemplary embodiment of a serial communications circuit 29 can receive 5 volt power (VBUS), two data lines (D+, D−), a ground connection (GND), and/or a cable shield connection (SH) from the flexible cable 17. The communications circuit 29 can include signal conditioning and/or electrostatic discharge protection. The communications circuit 29 can provide 5 volt power (VUSB) to the electrical power subsystem 30 and/or two serial communications lines (DP, DN), and/or a disconnect detection line (DCN) to the microprocessor 24.

An exemplary embodiment of a programming connection 31 can comprise a connector that provides a programming and/or debugging interface to the microprocessor 24 through an Joint Test Action Group (JTAG) port An exemplary embodiment of status indicators 35 can comprise seven, or any number, of light emitting diodes that can receive digital output (G0, R0, R1, R2, R3, R4, and/or R5) from the microprocessor 24 to indicate the on/off power status of the board, the on/off status of each of the five vibrational motors 25, and/or any other status or debugging information.

An exemplary embodiment of a microprocessor 24 (for example, the STM32F103V8 from STMicroelectronics, Geneva, Switzerland) can include a central processing unit (CPU), random access memory (RAM), non-volatile memory, digital input and/or output, built-in timers, integrated analog-to-digital conversion, serial communications, I2C communications, and/or a JTAG port for programming/debugging. Software uploaded to microprocessor 24 through the JTAG port of the programming connection 31 can be stored in non-volatile memory and/or, on power-up of the portable electronics 14, loaded into RAM and/or executed by the CPU.

Certain exemplary embodiments can provide mobile human-machine interface functionality similar to that provided by a keyboard and/or mouse for desktop computing. In operation, one can wear the gloves in a normal manner. The camera 13 can be positioned such that its field of view can extend outwards to provide its internal sensor with visibility to the light emitting diodes 11 on the back of the gloves. The flexible cable 17 and/or computing system 23 can be integrated in a comfortable manner within the fabric of an outer layer of clothing, held in place by fabric, stitching, hook-and-loop fastener, and/or by any other means, and/or, if applicable, integrated within other systems within a protective suit.

Figure 11:
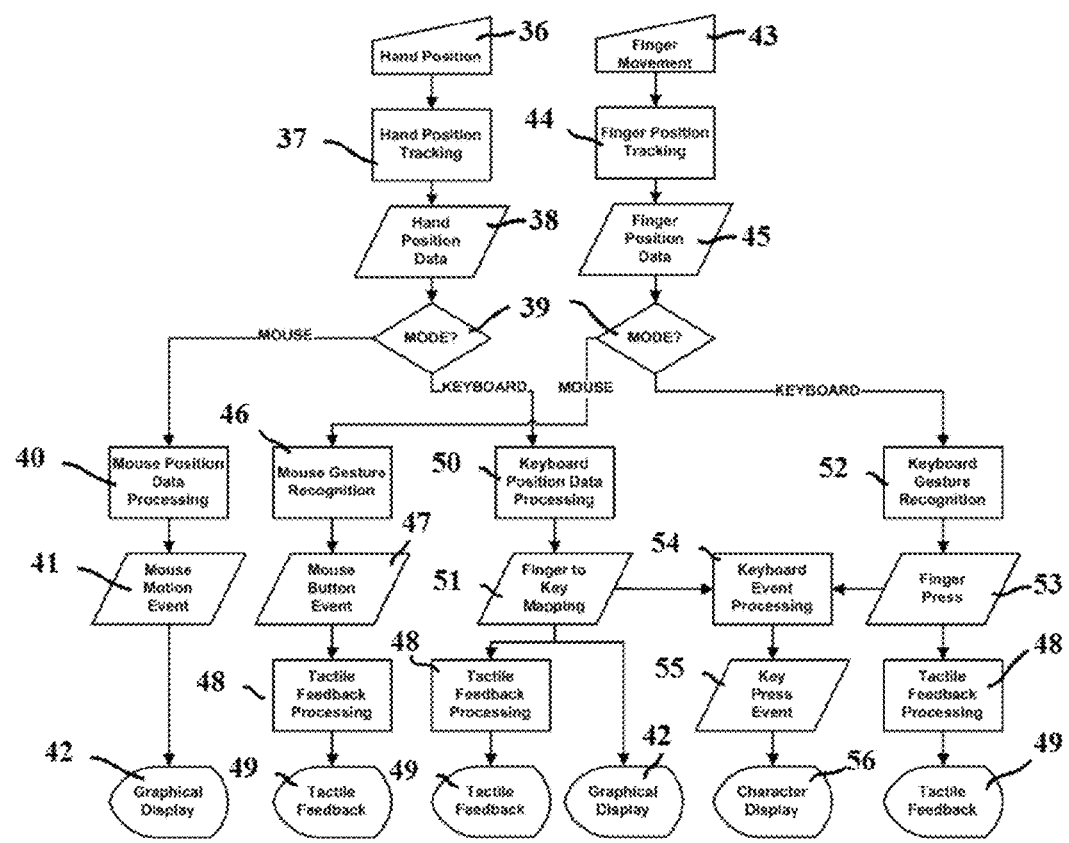
FIG. 11 is a software flow chart illustrating an exemplary human-machine interface.

FIG. 11 is a software flow chart illustrating an exemplary processor-based human-machine interface process for exemplary protective gloves that provide keyboard and/or mouse capability using motion sensing transducers of hand position, motion sensing transducers of finger movement, and/or tactile sensory output transducers. The human-machine interface process can be driven by one or more hand position 36 and/or finger movement 43 inputs by a human operator and/or can produce sensory feedback to the human operator in the form of a tactile feedback display 49, a graphical display 42, and/or a character display 56. The flow can have one or a multitude of branches corresponding to the system mode 39 which can take one or more enumerated values including MOUSE and KEYBOARD.

The hand position tracking process 37 can observe hand position input 36 through the position and/or motion of any and/or each light emitting diodes 11 on the back of one or more outer gloves 12. The hand position tracking process 37 can utilize the processor to calculate the pixel location of each light emitting diode in a continuous stream of digital image frames generated by the camera 13 at a predetermined rate, which can be approximately 20 to approximately 120 frames per second, e.g., approximately 100 frames per second. Via the hand position tracking process 37, the processor can use the light emitting diode pixel locations to calculate the position and/or orientation of the outer glove 12 with respect to the camera 13. Knowledge of the position and/or orientation of the camera 13 can be used by the processor to calculate hand position data 38 representing the position and/or orientation of the outer glove 12 with respect to the user's torso, helmet, and/or any other object.

If the system mode 39 is MOUSE, hand position data 38 can be used by mouse position data processing 40 to determine cursor position, or a change in cursor position, on a two-dimensional graphical display 42. In certain exemplary embodiments, a change in hand position from a previous position can be used by a processor to calculate an incremental change in the pixel location of the cursor. The change in cursor pixel location can be encapsulated in mouse motion event data 41 that can be used by any application software and/or rendered through the graphical display 42.

To convert hand position data to cursor position, the processor can implement an algorithm such as that suggested by the following Java code segment:

```
public void motionActionPerformed(HandMotionEvent event)
{
  // only respond if we're in MOUSE mode
  if             (systemMode==SystemMode.MOUSE)
  {
    // implement differential mode mouse using (x, y)
    // position from camera
    final double xs=event.getX( );
    final double ys=event.getY( );
    int dx=(int) (_xGain*(xs-_xLast));
    int dy=(int) (_yGain*(ys-_yLast));
    // prevent large jumps when tracked object pops in/out of view
    final int dmax=300;
    if (dx>dmax) {dx=0; dy=0;}
      else if (dx<-dmax) {dx=0; dy=0;}
      else if (dy>dmax) {dx=0; dy=0;}
      else if (dy<-dmax) {dx=0; dy=0;}
    // get current cursor location
    final Point location=MouseInfo.getPointerInfo( ).getLocation( );
    // increment cursor location by (dx, dy)
    mouseMove(location.x+dx, location.y+dy);
    // save previous object (x, y) position
    _xLast=xs;
    _yLast=ys;
  }
}
```

The finger position tracking process 44 can observe finger movement input 43. Via the finger position tracking process 44, the processor can provide digitized data from each flexion sensor analog circuit 32 to a first order low pass filter to calculate finger position data 45 that is substantially free of high frequency noise. This low pass filter can be implemented with a cutoff frequency in the range of approximately 10 to approximately 100 (e.g., approximately 50) cycles per second. The finger position data 45 can thus represent the position of any or all digits with respect to one or both hands.

If the system mode 39 is MOUSE, finger position data 45 can be used by mouse gesture recognition process 46 to generate mouse button event data 47. Mouse button event data 47 can include user interface events that would normally be generated by a standard computer mouse in desktop computing, including, but not limited to, MOUSE_CLICK, MOUSE_DOUBLE_CLICK, MOUSE_DOWN, MOUSE_UP, and/or WHEEL_SCROLL for any or all buttons including LEFT, RIGHT, and/or MIDDLE, etc. The computing system 23 can interpret these mouse button events as if they were generated by a standard computer mouse.

The recognition of a finger tapping motion in the mouse gesture recognition process 46 can comprise: (1) estimation of individual finger speed as the change in finger position over a predetermined clock interval on the processor which can be in a range between approximately 0.1 and approximately 20 (e.g., approximately 1.0) milliseconds, (2) detection of a speed that exceeds a predetermined positive speed threshold (rising edge), and (3) a subsequent detection of a speed less than a predetermined negative speed threshold (falling edge, corresponding to an arresting motion). During the interval between detection of the rising and falling edge of an individual finger, the gesture recognition process can be suspended for all other fingers on the associated hand. This temporary suspension can prevent natural finger motion synergies (for example between the ring and pinky fingers) from generating erroneous events.

In certain exemplary embodiments, the mouse gesture recognition process 46 can utilize the thumb and/or any other finger or combination of fingers on either or both hands to drive LEFT mouse button events. A tapping motion of the digit(s) can generate a LEFT MOUSE_CLICK event. Two sequential tapping motions that occur for the same finger within a predetermined time interval, which can be between approximately 100 and approximately 1000 (e.g., approximately 300) milliseconds, can generate a LEFT MOUSE_DOUBLE_CLICK event. A continuous flexion of the digit(s) can generate a LEFT MOUSE_DOWN event, and/or reversal of the continuous flexion of the digit(s) can generate a LEFT MOUSE_UP event.

In certain exemplary embodiments, the mouse gesture recognition process 46 can utilize the index and/or any other finger or combination of fingers on either or both hands to drive RIGHT mouse button events. A tapping motion of the digit(s) can generate a RIGHT MOUSE_CLICK event. Two sequential tapping motions that occur for the same finger within a predetermined time interval, which can be between approximately 100 and approximately 1000 (e.g., approximately 300) milliseconds, can generate a RIGHT MOUSE_DOUBLE_CLICK event. A continuous flexion of the digit(s) can generate a RIGHT MOUSE_DOWN event, and/or reversal of the continuous flexion of the digit(s) can generate a RIGHT MOUSE_UP event.

In certain exemplary embodiments, the mouse gesture recognition process 46 can utilize the middle and/or any other finger or combination of fingers on either or both hands to drive MIDDLE mouse button events. A tapping motion of the digit(s) can generate a MIDDLE MOUSE_CLICK event. Two sequential tapping motions that occur for the same finger within a predetermined time interval, which can be between approximately 100 and approximately 1000 (e.g., approximately 300) milliseconds, can generate a MIDDLE MOUSE_DOUBLE_CLICK event. A continuous flexion of the digit(s) can generate a MIDDLE MOUSE_DOWN event, and/or reversal of the continuous flexion of the digit(s) can generate a MIDDLE MOUSE_UP event.

In certain exemplary embodiments, the mouse gesture recognition process 46 can utilize a simultaneous grasping (finger flexion) motion of the thumb and index finger or any other gesture involving any combination of fingers on either or both hands to drive WHEEL_SCROLL events. In certain exemplary embodiments, right hand gestures can be interpreted as forward (positive) WHEEL_SCROLL events and/or left hand gestures as backward (negative) WHEEL_SCROLL events.

In certain exemplary embodiments, tactile feedback processing 48 can generate tactile sensory waveforms, corresponding to mouse button event data 47, which can be rendered through a tactile feedback display 49. In certain exemplary embodiments, the tactile feedback display 49 can comprise a microprocessor 24, a vibrational motor control circuit 34, and/or one or more vibrational motors 25. In certain exemplary embodiments, tactile sensory waveforms can be applied to the finger or fingers associated with event generation. For example, for a LEFT MOUSE_CLICK event, tactile feedback processing 48 can generate a waveform (to a thumb aligned vibrational motor 25) consisting of two approximately 50 to approximately 300 (e.g., approximately 175) cycles-per-second square-wave pulses of approximately 5 to approximately 50 (e.g., approximately 14) meters-per-second-squared amplitude, with approximately 10 to approximately 50 (e.g., approximately 25) millisecond pulse duration and/or approximately 10 to approximately 50 (e.g., approximately 25) millisecond inter-pulse delay. In a similar manner, MOUSE_DOWN and/or MOUSE_UP events can result in single approximately 50 to approximately 300 (e.g., approximately 175) cycles-per-second square-wave pulses of approximately 10 to approximately 50 (e.g., approximately 14) meters-per-second-squared amplitude and/or approximately 10 to approximately 50 (e.g., approximately 25) millisecond duration to the corresponding finger. For MOUSE_DOUBLE_CLICK events, tactile feedback processing 48 can generate a waveform consisting of two MOUSE_CLICK tactile events, with an approximately 20 to approximately 100 (e.g., approximately 50) millisecond delay between the two. For WHEEL_SCROLL events, tactile feedback processing 48 can produce three approximately 50 to approximately 300 (e.g., approximately 175) cycles-per-second square-wave pulses in the thumb and/or index finger aligned motors of approximately 5 to approximately 50 (e.g., approximately 7) meters-per-second-squared amplitude, with approximately 20 to approximately 80 (e.g., approximately 40) millisecond pulse duration and/or approximately 20 to approximately 80 (e.g., approximately 40) millisecond inter-pulse delay.

If the system mode 39 is KEYBOARD, finger position data 45 can be used by keyboard gesture recognition process 52 to generate finger press data 53. Keyboard event processing 54, can utilize the combination of finger press data 53 and the finger to key mapping 51, to generate key press events that can be used by any application software and/or rendered by one or more character displays 56 and/or graphical displays 42.

In certain exemplary embodiments, the keyboard gesture recognition process 52 can utilize finger position data 45 to recognize motions by one or more fingers or combinations of fingers. In certain exemplary embodiments, the keyboard gesture recognition process 52 can interpret a tapping motion by an individual finger as a key strike by that finger, encapsulated in finger press data 53. The keyboard gesture recognition process 52 can comprise: (1) estimation of individual finger speed as the change in finger position over a predetermined clock interval on the processor which can be in a range between approximately 0.1 and approximately 20 (e.g., approximately 1.0) milliseconds, (2) detection of a speed that exceeds a predetermined positive speed threshold (rising edge), and (3) a subsequent detection of a speed less than a predetermined negative speed threshold (falling edge, corresponding to an arresting motion). During the interval between detection of the rising and falling edge of an individual finger, the gesture recognition process can be suspended for all other fingers on the associated hand. This temporary suspension can prevent natural finger motion synergies (for example between the ring and pinky fingers) from generating erroneous key strikes.

Figure 12:
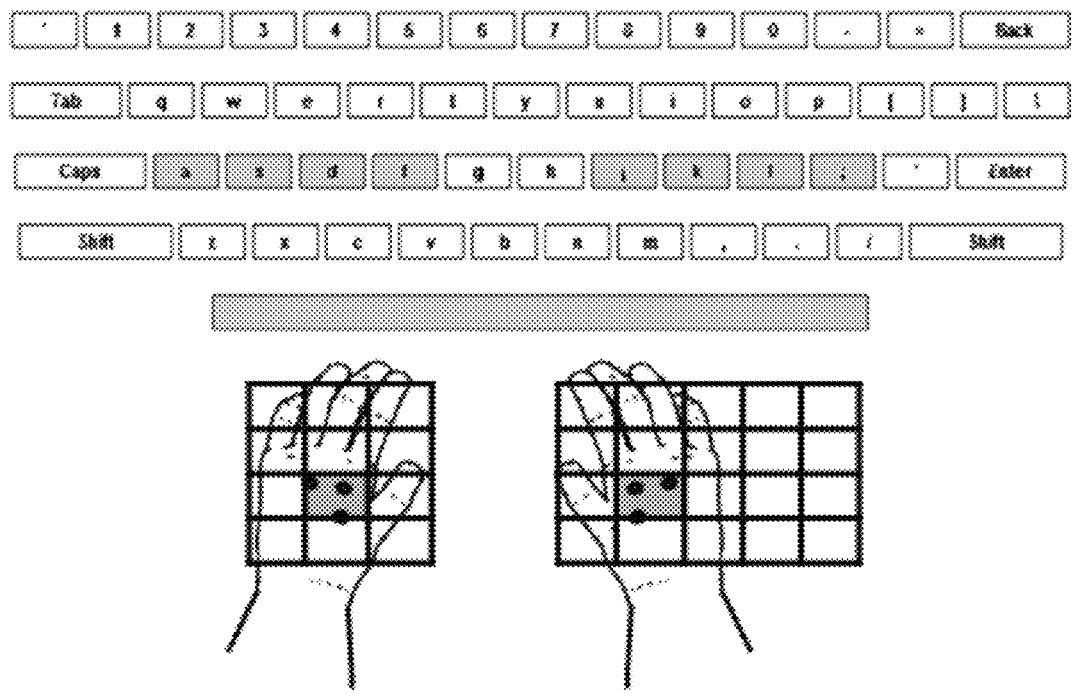
FIG. 12 shows the mapping between fingers and keys on a keyboard for the "home" hand position in an exemplary human-machine interface.
Figure 13:
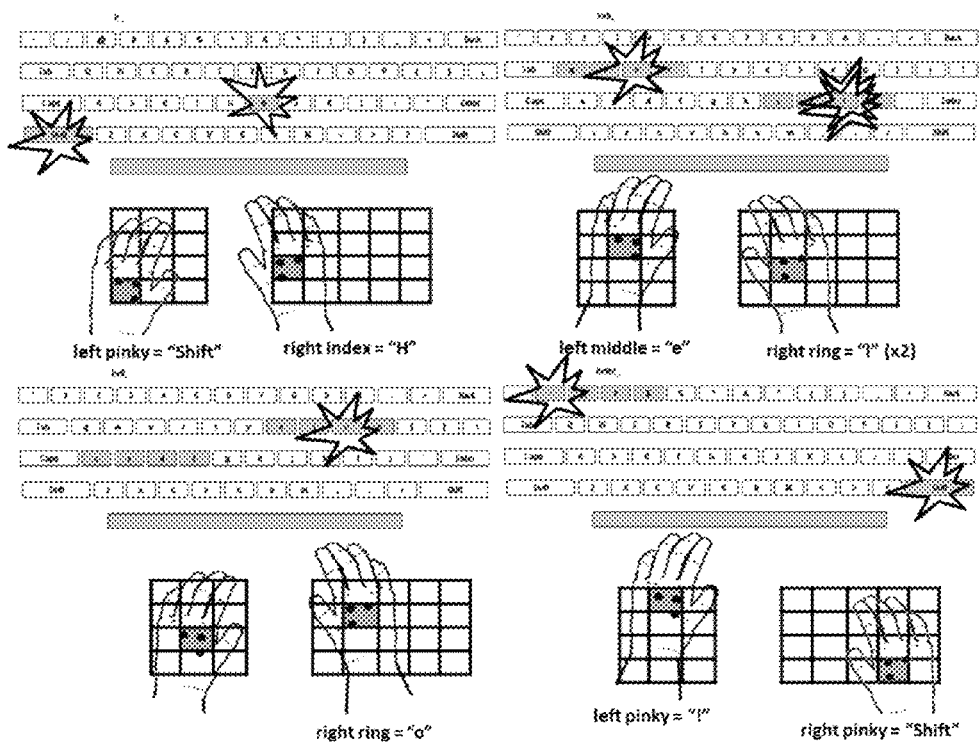
FIG. 13 illustrates use of an exemplary embodiment to type the phrase "Hello!" using a combination of hand motion and the key strike finger gestures.

If the system mode 39 is KEYBOARD, motion sensing transducers of hand position, motion sensing transducers of finger movement, and/or tactile sensory output transducers can be used to enable virtual touch typing by the person wearing protective gloves. In certain exemplary embodiments, hand position data 38 can be used by keyboard position data processing 50 to generate finger to key mapping data 51. Finger to key mapping data 51 can associate each of one or more fingers on each hand with a keyboard character on a virtual keyboard. In certain exemplary embodiments, keyboard position data processing 50 can emulate a QWERTY keyboard. In certain exemplary embodiments, keyboard position data processing 50 can use a grid arrangement (as shown in FIG. 12) to assign keys to fingers based on the projection of hand position data 38 onto the two-dimensional grid. When entering KEYBOARD mode, the current left and/or right hand position can become "home" position. In this case (which is illustrated in FIG. 12) four fingers on either and/or each hand can be mapped to keys in the center of the virtual board, with the thumbs on each hand mapped to the space bar. In this home position, consistent with a conventional keyboard, the four (non-thumb) fingers of the left hand can be mapped to the characters "a," "s," "d," and/or "f" and/or the fingers on the right hand to "j," "k," "l," and/or ";". From this home position, keyboard position data processing 50 can permit the user to access other keys through short hand movements to other grid positions. In certain exemplary embodiments, an approximately 3×4 grid can be assigned to the left hand and/or an approximately 5×4 grid can be assigned to the right hand (as shown in FIG. 12) providing access to an entire QWERTY keyboard layout. FIG. 13 illustrates an exemplary use of this method to type out the phrase "Hello!" using a combination of hand motion and the following key strike finger gesture sequence: (1) left pinky, (2) right index, (3) left middle, (4) right ring, (5) right ring, (6) right ring, (7) right pinky, and/or (8) left pinky.

To convert hand position data 38 to finger to key mapping data 51, the processor can implement an algorithm such as that suggested by the following Java code segment:

```
// ChordGenerator is a software object that maps hand position to a finger
// to key mapping "Chord"
public class ChordGenerator
    extends ChordEventGenerator implements HandMotionListener {
        // associate with a Hand
        private Hand _hand;
        // initialize hand position to center
        private double _xLast = 0.5, _yLast = 0.5, _zLast = 0.5;
        private double _xState = 0.5, _yState = 0.5, _zState = 0.5;
        // movement gains, similar to mouse gain
        private double _xGain, _yGain, _zGain;
        private int _row = 1, _column = 1;
        private double _hysteresis;
        private ChordMapping _chordMapping;
        // constructor
        public ChordGenerator(Hand hand, ChordMapping chordMapping,
            double hysteresis, double xGain, double yGain, double
            zGain) {
```

```java
        _hand = hand;
        _hysteresis = hysteresis;
        _chordMapping = chordMapping;
        _xGain = xGain;
        _yGain = yGain;
        _zGain = zGain;
    }
    // Take action when a change in hand position is detected
    public void motionActionPerformed(HandMotionEvent event) {
        // return if the incoming event is associated with the
        // wrong hand
        if (!event.getHand( ).equals(_hand)) return;
        // get the motion data provided by the camera tracker
        final double xs = event.getX( );
        final double ys = event.getY( );
        final double zs = event.getZ( );
        // use differential position so no calibration is needed
        final double dx = xs - _xLast;
        final double dy = ys - _yLast;
        final double dz = zs - _zLast;
        _xState += _xGain*dx;
        _yState += _yGain*dy;
        _zState += _zGain*dz;
        // limit range of the grid
        final double eps = 1e-6;
        if (_xState < 0.0) _xState = 0.0;
        if (_xState >= 1.0) _xState = 1.0 - eps;
        if (_yState < 0.0) _yState = 0.0;
        if (_yState >= 1.0) _yState = 1.0 - eps;
        if (_zState < 0.0) _zState = 0.0;
        if (_zState >= 1.0) _zState = 1.0 - eps;
        // keep track of previous state
        _xLast = xs;
        _yLast = ys;
        _zLast = zs;
        // keep track of previous row and column
        final int oldRow = _row;
        final int oldColumn = _column;
        // Get grid row, column from normalized
        // x, y hand position on a regular grid in range ([0, 1],[0, 1])
        final double yhat =
            (_yState* chordMapping.getNumberOfRows( )) + 1;
        final double xhat =
            (_xState* chordMapping.getNumberOfColumns( )) + 1;
        final double ytest = yhat - _row;
        // add hysteresis to limit bouncing on grid edges
        if ( ( ytest <-( _hysteresis)) || (ytest > 1+(_hysteresis)) ) {
            _row = (int)yhat;
        }
        final double xtest = xhat - _column;
        if ( ( xtest <-(_hysteresis)) || (xtest > 1+(_hysteresis)) ) {
            _column = (int)xhat;
        }
        if ( ( _row != oldRow) || ( _column != oldColumn) ) {
            // inform users of finger-to-key mapping data
            // for new row, column
            fireEvent(_chordMapping.getChord(_row, _column));
            // provide tactile feedback on new hand position
            fireEvent(TactileEvent.getChordEvent(this.getHand( )));
        }
    }
}
// Chord is a software object that defines a mapping between fingers on a
// hand and keys on a virtual keyboard
public class Chord {
    private Key[ ] _keys;
    private Hand _hand = null;
    // constructor
    public Chord(Key thumb, Key index,
            Key middle, Key ring, Key pinky) {
        _keys = new Key[5];
        _keys[0] = thumb;
        _keys[1] = index;
        _keys[2] = middle;
        _keys[3] = ring;
        _keys[4] = pinky;
    }
}

// Key is a software object that encapsulates data associated with a key on
// a virtual keyboard
public enum Key {
    TILDE(' ','~'), ONE('1','!'), TWO('2','@'), THREE('3','#'),
    FOUR('4','$'), FIVE('5','%'), TAB('\t','\t',"Tab"), Q('q','Q'),
    W('w','W'), E('e','E'), R('r','R'), T('t','T'), CAPS('\0','\0',"Caps"),
    A('a','A'), S('s','S'), D('d','D'), F('f','F'), G('g','G'), Z('z','Z'),
    X('x','X'), C('c','C'), V('v','V'), B('b','B'), SIX('6','^'),
    SEVEN('7','&'), EIGHT('8','*'), NINE('9','('), ZERO('0',')'),
    DASH('-','_'), EQUALS('=','+'), BACKSPACE('\b','\b',"Back"),
    Y('y','Y'), U('u','U'), I('i','I'), o('o','o'), P('p','P'),
    LEFTBRACE('[','{'), RIGHTBRACE(']','}'), BACKSLASH('\\','|'),
    H('h','H'), J('j','J'), K('k','K'), L('l','L'), COLIN(';',':'),
    PAREN('\'','\"'), ENTER('\r','\r',"Enter"),
    N('n','N'), M('m','M'), COMMA(',','<'), PERIOD('.','>'),
    FORWARDSLASH('/','?'), LEFTSHIFT('\0','\0',"Shift"),
    RIGHTSHIFT('\0','\0',"Shift"), SPACE(' ',' '," "), NULL('\0','\0');
    private char _lower; // key's normal (lowercase) char
    private char _upper; // key's shift char
    private String _text; // key's display text
    // private constructor
    Key(char lower, char upper, String text) {
        _lower = lower;
        _upper = upper;
        _text = text;
    }
}
// LeftHandChordMapping is a software object that translates left hand
// position on a Chord grid to the mapping between fingers and keys
public class LeftHandChordMapping extends ChordMapping {
    // define size of grid
    private final static int nRows = 4;
    private final static int nColumns = 3;
    // public constructor
    public LeftHandChordMapping( ) {
        super(nRows, nColumns);
        // populate the grid
        this.setChord(1,1,
            Chord.getPinkyFingerOnlyChord(Key.TILDE));
        this.setChord(1,2, new
            Chord(Key.FOUR,Key.THREE,Key.TWO,Key.ONE));
        this.setChord(1,3,
            Chord.getIndexFingerOnlyChord(Key.FIVE));
        this.setChord(2,1,
            Chord.getPinkyFingerOnlyChord(Key.TAB));
        this.setChord(2,2, new
            Chord(Key.R,Key.E,Key.W,Key.Q));
        this.setChord(2,3,
            Chord.getIndexFingerOnlyChord(Key.T));
        this.setChord(3,1,
            Chord.getPinkyFingerOnlyChord(Key.CAPS));
        this.setChord(3,2, new
            Chord(Key.F,Key.D,Key.S,Key.A));
        this.setChord(3,3,
            Chord.getIndexFingerOnlyChord(Key.G));
        this.setChord(4,1,
            Chord.getPinkyFingerOnlyChord(Key.LEFTSHIFT));
        this.setChord(4,2, new
            Chord(Key.V,Key.C,Key.X,Key.Z));
        this.setChord(4,3,
            Chord.getIndexFingerOnlyChord(Key.B));
        // the mapping knows which hand it is associated with
        this.setHand(Hand.LEFT);
    }
}
//RightHandChordMapping is a software object that translates right hand
// position on a Chord grid to the mapping between fingers and keys
public class RightHandChordMapping extends ChordMapping {
    // define size of grid
    private final static int nRows = 4;
    private final static int nColumns = 5;
    // public constructor
    public RightHandChordMapping( ) {
        super(nRows, nColumns);
        // populate the grid
        this.setChord(1,1,
            Chord.getIndexFingerOnlyChord(Key.SIX));
        this.setChord(1,2, new
            Chord(Key.SEVEN,Key.EIGHT,Key.NINE,Key.ZER0));
        this.setChord(1,3,
```

```
        Chord.getPinkyFingerOnlyChord(Key.DASH));
    this.setChord(1,4,
        Chord.getPinkyFingerOnlyChord(Key.EQUALS));
    this.setChord(1,5,
        Chord.getPinkyFingerOnlyChord(Key.BACKSPACE));
    this.setChord(2,1,
        Chord.getIndexFingerOnlyChord(Key.Y));
    this.setChord(2,2, new Chord(Key.U,Key.I,Key.O,Key.P));
    this.setChord(2,3,
        Chord.getPinkyFingerOnlyChord(Key.LEFTBRACE));
    this.setChord(2,4,
        Chord.getPinkyFingerOnlyChord(Key.RIGHTBRACE));
    this.setChord(2,5,
        Chord.getPinkyFingerOnlyChord(Key.BACKSLASH));
    this.setChord(3,1,
        Chord.getIndexFingerOnlyChord(Key.H));
    this.setChord(3,2, new
        Chord(Key.J,Key.K,Key.L,Key.COLIN));
    this.setChord(3,3,
        Chord.getPinkyFingerOnlyChord(Key.PAREN));
    this.setChord(3,4,
        Chord.getPinkyFingerOnlyChord(Key.ENTER));
    this.setChord(3,5,
        Chord.getPinkyFingerOnlyChord(Key.ENTER));
    this.setChord(4,1,
        Chord.getIndexFingerOnlyChord(Key.N));
    this.setChord(4,2, new
        Chord(Key.M,Key.COMMA,Key.PERIOD,
            Key.FORWARDSLASH));
    this.setChord(4,3,
        Chord.getPinkyFingerOnlyChord(Key.RIGHTSHIFT));
    this.setChord(4,4,
        Chord.getPinkyFingerOnlyChord(Key.RIGHTSHIFT));
    this.setChord(4,5,
        Chord.getPinkyFingerOnlyChord(Key.RIGHTSHIFT));
    // the mapping knows which hand it is associated with
    this. setHand(Hand.RIGHT);
    }
}
```

To convert finger to key mapping data 51 and finger press data 53 to key press event data 55, the processor can implement an algorithm such as that suggested by the following Java code segment:

```
// KeyboardRobot is a software class that listens for finger press events
// and chord events, when a finger press event occurs, it generates the
// appropriate key press event according to the current finger to key
// mapping defined by hand position
public class KeyboardRobot extends KeyboardEventGenerator
    implements GloveEventListener, ChordEventListener{
    // keep track of the Chords for both hands
    private Chord _currentLeftHandChord = null;
    private Chord _currentRightHandChord = null;
    // keep track of the shift state of keyboard
    private boolean _isShifted = false;
    // when a finger gesture is recognized, generate a keyboard response
    public void gloveActionPerformed(GloveEvent event) {
        // handle left hand events
        if (event.getHand( ) == geco interface.Hand.LEFT) {
            // if key event is a Shift, change shift state of keyboard
            if ((_currentLeftHandChord.getKey(event.getFinger( ))
                    == Key.LEFTSHIFT) ||
                (_currentLeftHandChord.getKey(event.getFinger( ))
                    == Key.RIGHTSHIFT)) {
                _isShifted = !_isShifted;
            }
            // generate the left hand key press event
            fireEvent(new KeyboardEvent(
                _currentLeftHandChord.getKey(event.getFinger( )),
                _isShifted));
        // handle right hand events
        }else if (event.getHand( ) == Hand.RIGHT) {
            // if key event is a Shift, change shift state of keyboard
            if ((_currentRightHandChord.getKey(event.getFinger( ))
                    == Key.LEFTSHIFT) ||
                (_currentRightHandChord.getKey(event.getFinger( ))
                    == Key.RIGHTSHIFT)) {
                _isShifted = !_isShifted;
            }
            // generate the right hand key press event
            fireEvent(new KeyboardEvent(
                _currentRightHandChord.getKey(event.getFinger( )),
                _isShifted));
        }
    }
    // when a new chord event occurs, change the chording state
    //    of the keyboard
    public void chordActionPerformed(Chord chord) {
        if (chord.getHand( ) == Hand.LEFT) {
            _currentLeftHandChord = chord;
        }else {
            _currentRightHandChord = chord;
        }
    }
}
```

The flow chart in FIG. 11 illustrates that in certain exemplary embodiments, tactile feedback processing 48 can generate tactile sensory waveforms, rendered through a tactile feedback display 49, to inform the user of a new hand position on the virtual keyboard. When a change in hand position 36 results in new finger to key mapping data 51, a tactile sensory waveform (rendered through a tactile feedback display 49) can signal the new mapping. In certain exemplary embodiments, the tactile sensory waveform can consist of two approximately 50 to approximately 300 (e.g., approximately 175) cycles-per-second square-wave pulses of approximately 5 to approximately 50 (e.g., approximately 7) meters-per-second-squared amplitude applied to all five fingers; with approximately 10 to approximately 50 (e.g., approximately 25) millisecond pulse duration and/or approximately 10 to approximately 50 (e.g., approximately 25) millisecond inter-pulse delay. In certain exemplary embodiments, hand movement back to the home position can be signaled by a unique tactile sensory waveform which can consist of three approximately 50 to approximately 300 (e.g., approximately 175) cycles-per-second square-wave pulses of approximately 5 to approximately 50 (e.g., approximately 7) meters-per-second-squared amplitude applied to all five fingers; with approximately 10 to approximately 50 (e.g., approximately 25) millisecond pulse duration and/or approximately 10 to approximately 50 (e.g., approximately 25) millisecond inter-pulse delay.

In certain exemplary embodiments, tactile feedback processing 48 can generate tactile sensory waveforms, rendered through a tactile feedback display 49, to confirm that finger press data 53 has been generated by keyboard gesture recognition 52. In certain exemplary embodiments, tactile feedback processing 48 can generate a tactile sensory waveform (rendered through a tactile feedback display 49) to the individual finger associated with the finger press data 53. In certain exemplary embodiments, the tactile sensory waveform can consist of two approximately 50 to approximately 300 (e.g., approximately 175) cycles-per-second square-wave pulses of approximately 5 to approximately 50 (e.g., approximately 14) meters-per-second-squared amplitude, with approximately 10 to approximately 50 (e.g., approximately 25) millisecond pulse duration and/or approximately 10 to approximately 50 (e.g., approximately 25) millisecond inter-pulse delay.

FIG. 1 shows an exemplary embodiment with three light emitting diodes 11 on the exterior of a glove 12. Three light emitting diodes can create a triad that can be tracked by a camera 13 as a rigid body. In this embodiment, the computing system 23 can calculate up to three-dimensional position coordinates (x, y, and/or z) for either and/or each triad as well as its orientation (roll, pitch, and/or yaw). This additional information can be used by the computing system 22 to create a richer set of user interactions in application software. User interactions can include manipulating software objects with three-dimensional geometry, designating points on a three-dimensional map display, providing control inputs to a robotic manipulator, and/or orienting hand position with respect to a three-dimensional virtual keyboard.

Figure 14:
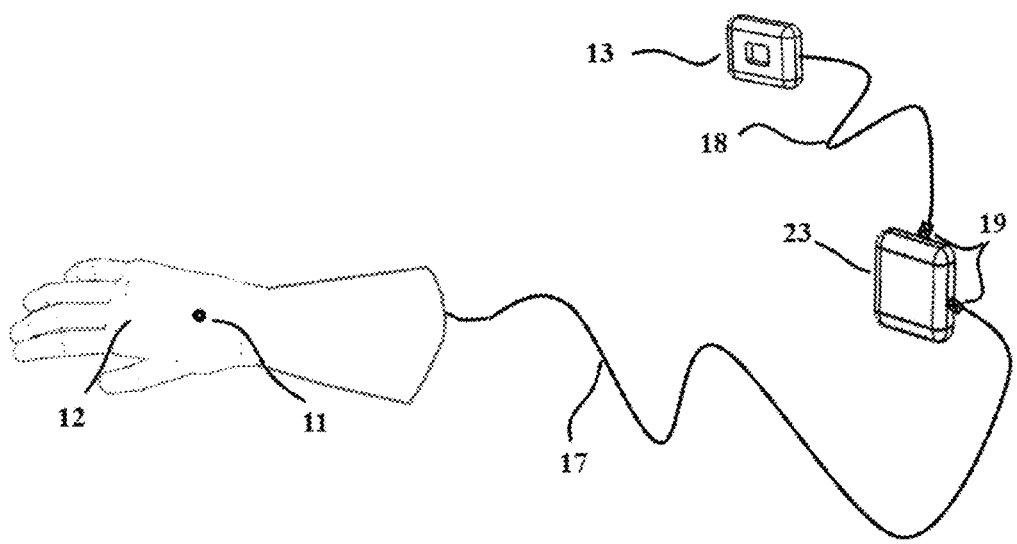
FIG. 14 is a perspective view of an exemplary human-machine interface constructed for use with a single hand.

In certain exemplary embodiments, the human-machine interface can comprise both left and right gloves. However, certain alternate embodiments can include only a single left or right hand glove. FIG. 14 shows a human-machine interface with a single right hand glove. This single hand embodiment can enable a full mouse emulation mode and/or a modified keyboard emulation mode. In this single-handed keyboard emulation mode, a distinct set of finger gestures (such as a simultaneous four finger tapping motion) can switch the finger-to-key mapping between the right and left side of the keyboard. In this way a single hand can access the entire set of keys.

FIG. 14 shows that in certain exemplary embodiments, a single or reduced number of light emitting diodes 11 may be placed on the back of the hand. In the case of a single light emitting diode 11, the image stream from the camera 13 can be used by the computing system 23 to calculate position coordinates (x, y, and/or z) of the glove with respect to the camera 13.

Figure 15:
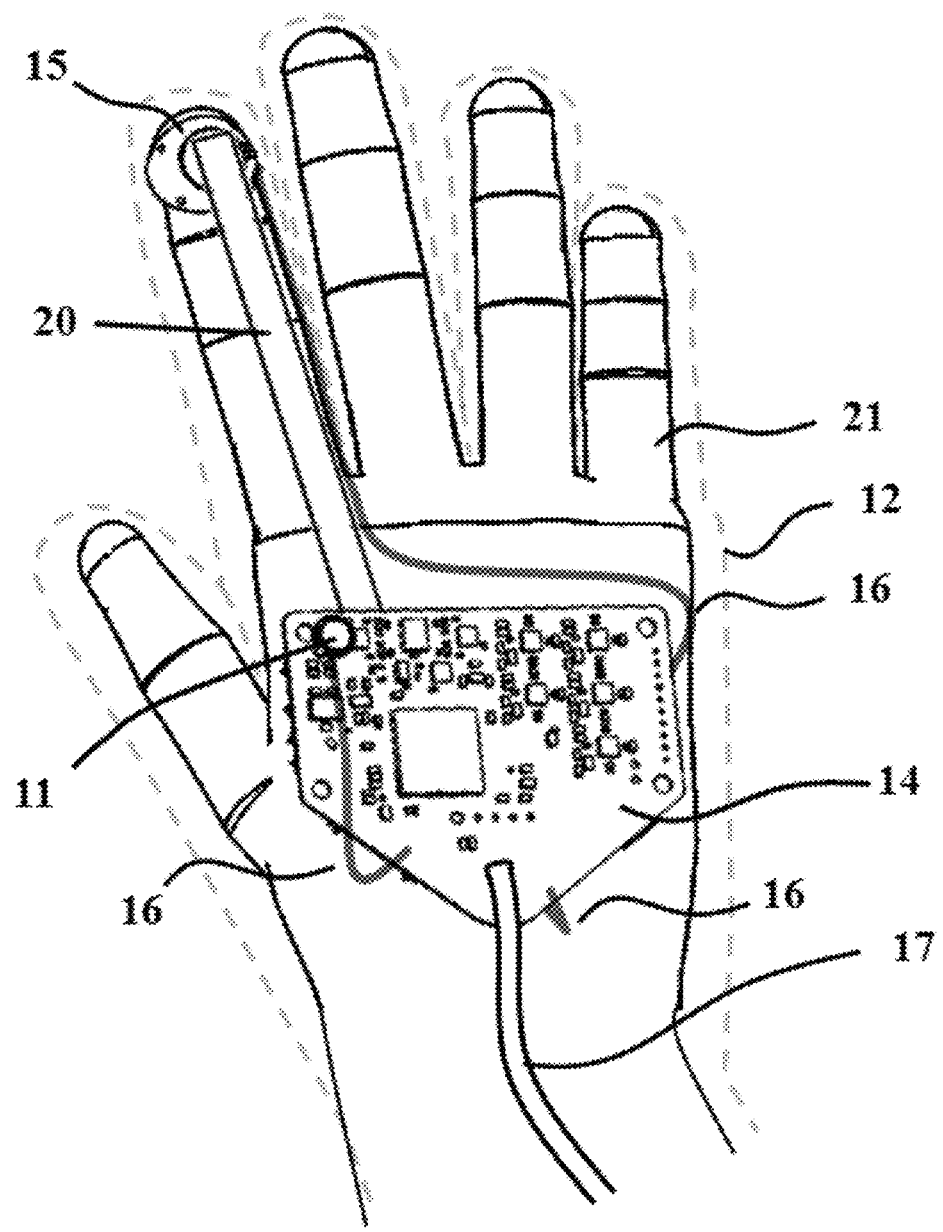
FIG. 15 shows a perspective view of the interior of an exemplary embodiment comprising a single flexion sensor and a single light emitting diode.

FIG. 15 shows a perspective view of the interior of an exemplary embodiment of the glove in FIG. 14. In certain exemplary embodiments, a single or reduced number of tactile actuation assemblies 15, light-emitting diodes 11, and/or flexion sensors 20 can be preferable in applications where low cost and/or simplicity are desired. Conversely, in applications where high fidelity sensing and/or tactile feedback performance are desired, a greater number of tactile actuation assemblies 15, light-emitting diodes 11, and/or flexion sensors 20 can be preferable.

Figure 16:
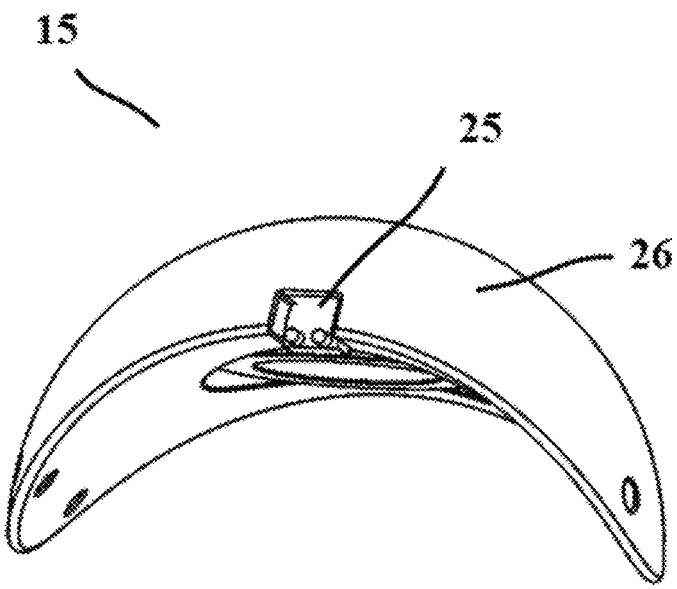
FIG. 16 shows an exemplary embodiment of a tactile actuation assembly in which a vibrational motor can move within an enclosing tactile adapter.

FIG. 16 shows an exemplary embodiment of a tactile actuation assembly 15 in which a vibrational motor 25, which can be of linear resonant actuator type or any alternative type, can move with respect to a tactile adapter 26 in which it is partially enclosed.

Figure 17:
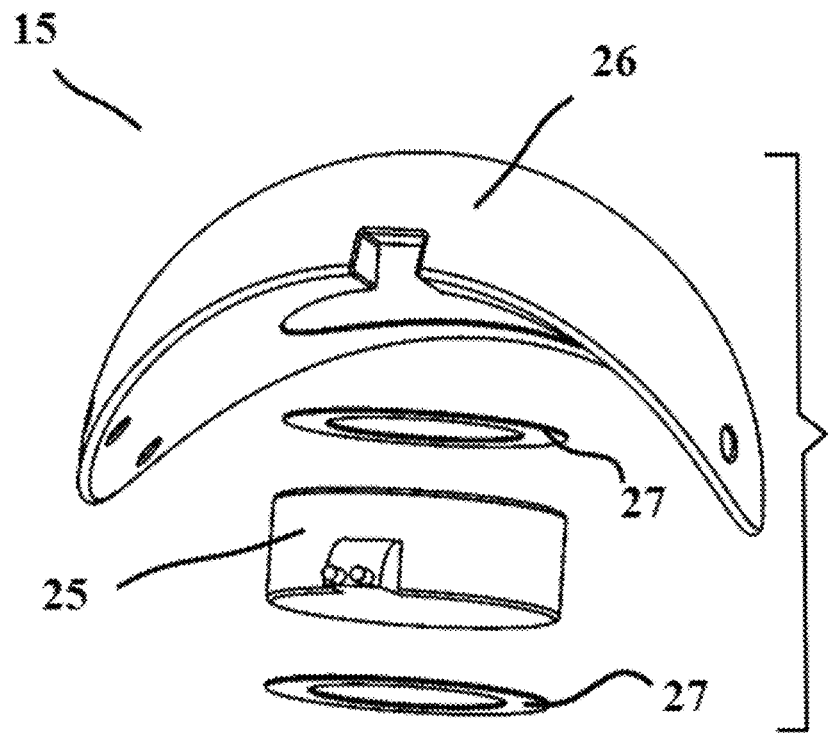
FIG. 17 shows an exploded view of FIG. 16, illustrating an exemplary relative placement of flexible gaskets and a vibrational motor within an exemplary tactile adapter.

FIG. 17 shows an exploded view of the exemplary embodiment of the tactile actuation assembly 15 shown in FIG. 16. Flexible gaskets 27 can provide a spring-like resistance to the oscillatory motion of the vibrational motor 25 within the tactile adapter 26. Flexible gaskets 27, which can be fabricated from rubber, foam, and/or metal, can provide desired force versus displacement (spring stiffness) and/or desired force versus velocity relationship (damping) properties. These properties can be selected to promote the efficient conversion of electrical energy (applied by portable electronics 14 to the vibrational motor 25) into mechanical vibrations on the surface of the human finger.

Figure 18:
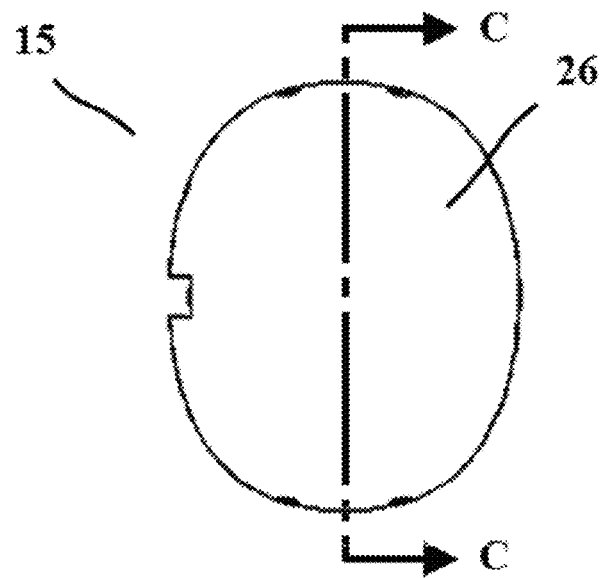
FIG. 18 shows a top view of an exemplary tactile actuation assembly.
Figure 19:
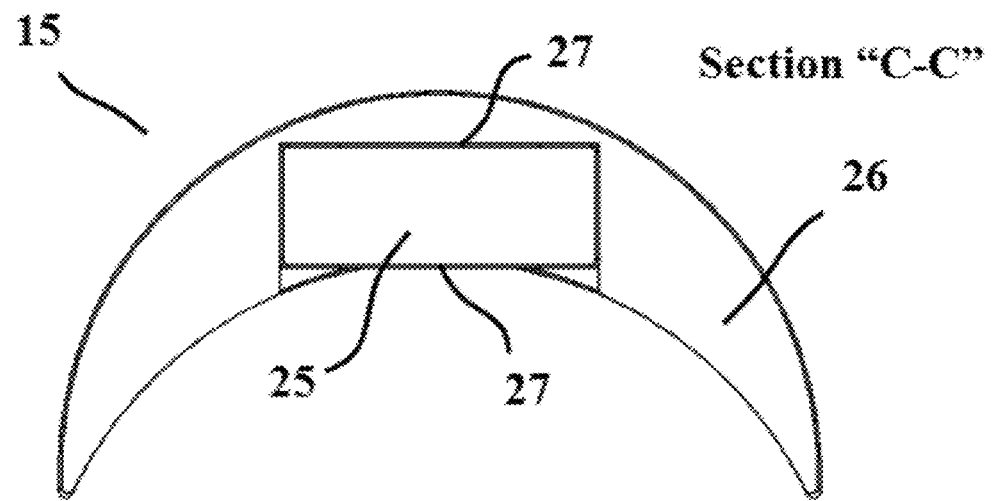
FIG. 19 shows a section view taken at section C-C of FIG. 12 in which a vibrational motor can move within an enclosing tactile adapter.

FIG. 18 shows a top view of the exemplary tactile actuation assembly 15 shown in FIG. 16 and identifies section C-C used in FIG. 19.

FIG. 19 shows a section view, taken at section C-C, of the exemplary tactile actuation assembly 15 shown in FIG. 18. Flexible gaskets 27 can be placed above and/or below the vibrational motor 25 such that the relative motion of the vibrational motor 25 with respect to the tactile adapter 26 is subject to the stiffness and/or damping properties of the flexible gaskets 27.

Figure 20:
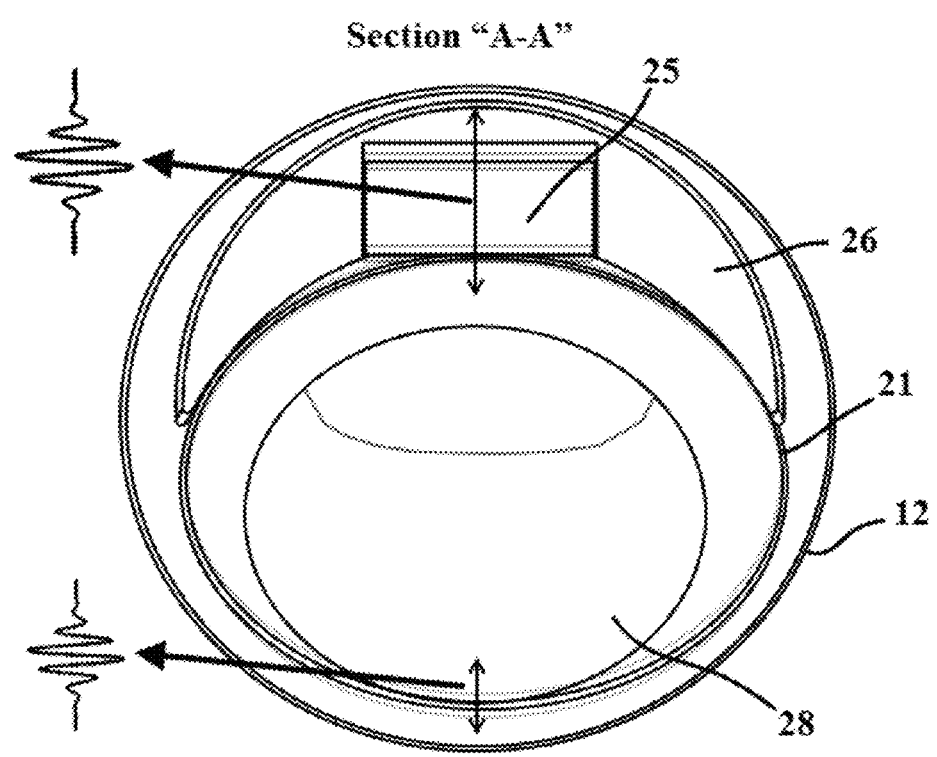
FIG. 20 shows a section view taken at section A-A of FIG. 2 for the exemplary embodiment shown in FIG. 16, and illustrates exemplary vibrational motion in an exemplary vibrational motor and an exemplary inner glove.

FIG. 20 shows a section view taken at section "A-A" of FIG. 2 for the exemplary embodiment of the tactile actuation assembly 15 shown in FIG. 16. In certain exemplary embodiments, such as a space suit, the gas within the pressure layer of the inner glove 21 can be maintained such that it exerts a greater pressure on the pressure layer than that exerted by the outside environment. In such cases, the inner glove layers can become stiffened, similar to the surface of an inflated balloon. As a result the glove material can become an efficient carrier of mechanical vibrations. The tactile adapter 26 can be operatively attached to the fabric of the inner glove 21. A linear resonant actuator type vibrational motor 25 can be held within a tactile adapter 26 such that its motion is limited to a direction normal to the surface of the inner glove 21. An amplitude-modulated drive voltage can be applied to the motor from the portable electronics 14 through the wiring harness 16. The resulting oscillatory forces in the vibrational motor 25 can cause it to push against the adjacent flexible gaskets 27. On the downward stroke of the vibrational motor 25, the flexible gasket 27 between the vibrational motor 25 and the inner glove 21 pushes against the material of the inner glove 21. On the upward stroke of the vibrational motor 25, the flexible gasket 27 between the vibrational motor 25 and the tactile adapter 26 pushes against the tactile adapter 26. The tactile adapter 26, in turn, pulls against the material of the inner glove 21. These oscillatory push/pull forces against material of the inner glove 21 generate vibrations (oscillatory displacements) in the inner glove 21 that carry around the pressure-stiffened material to the human finger 28. The mechanical vibrations, induced by oscillations of the inner glove 21 against the human finger 28, result in perceptible tactile sensation. The stiffness and/or damping of the flexible gaskets 27 can be selected (experimentally or analytically) to improve the transfer of electrical energy from the portable electronics 14 to mechanical energy in vibrations at the human fingertip.

Certain exemplary embodiments can require the availability of an electrical power and/or data connection to the gloves. Of note, space suits used by NASA typically have a power harness for glove fingertip heaters that can be modified to provide a power and/or data conduit for the gloves.

Certain exemplary embodiments can be used in concert with a visual element such as a flat panel display, video eyewear (such as the Tac-Eye LT display from Vuzix Corporation, Rochester), and/or a helmet-mounted display.

Certain exemplary embodiments can employ any of several alternative technologies for each of hand motion tracking, finger gesture recognition, and/or vibrotactile actuation.

For motion tracking, certain exemplary embodiments can employ any of:
- an infrared camera mounted on the protective suit to track the position of three light-emitting diodes (LEDs) on the back of the gloves;
- a single, or any number of LEDs;
- LEDs that emit at 850 nm or any other wavelength;
- any number of passive markers on the gloves and/or active IR illumination to provide targets for a suit-mounted infrared camera to track;
- magnetic tracking to track hand position;
- acoustic tracking to track hand position;
- a computer vision algorithm to estimate hand position from images generated by a suit-mounted camera;
- accelerometers on the hands to measure hand motion;
- a suit-mounted camera and/or a structured light emitter to generate a three-dimensional depth map that can be processed to estimate hand position (for example the Kinect sensor from Microsoft Corporation, Redmond, Wash.);

a scanning laser and associated optics to estimate hand position;

a suit-integrated joint position sensing (e.g. optical encoders, potentiometers, fiber optics, and/or resistive bend sensors) for hand position; and/or any other sensor type that provides information on hand motion.

For finger sensing, certain exemplary embodiments can employ any of:

resistive bend sensors (thin film potentiometers) aligned with each finger to provide an estimate of finger flexion;

fiber optic bend sensors aligned with fingers in a manner similar to the resistive bend sensors;

magnetic tracking to track individual finger positions;

acoustic tracking to track individual finger positions;

a computer vision algorithm to estimate hand pose from images generated by a camera;

a camera and/or a structured light emitter to generate a three-dimensional depth map that can be processed to estimate hand pose (for example the Kinect sensor from Microsoft Corporation, Redmond, Wash.);

a scanning laser and/or associated optics to estimate hand pose; and/or accelerometers on the fingers to measure finger motion;

any other sensor type or combination of sensor types that provides information on finger motion;

five finger sensors integrated in each glove, one for each digit;

finger sensing integrated for only a single finger, or any number of fingers less than five; and/or more than one sensor may be placed with each finger to permit measurement of individual joint angles.

For generating tactile feedback, certain exemplary embodiments can employ any of:

linear resonant actuators (LRAs) from Precision Microdrives Inc.;

other electromechanical motors employing an electrical coil-induced magnetic current to create an oscillating force between itself and a permanent magnet;

a rotary motor employing an off-balance mass to generate the necessary vibrations;

piezo-electric film and/or piezo-electric disks driven by an alternating current to generate the necessary mechanical vibrations;

an electro-active polymer actuator to generate the necessary vibrations;

electrostatic actuator to generate the necessary vibrations; and/or any other actuator type to generate the necessary vibrations.

For applying tactile feedback, certain exemplary embodiments can employ any of:

five tactile actuators integrated into each glove, one for each digit;

tactile feedback to only a single finger, or any number of fingers less than five;

tactile feedback to the hand, or other body part, in addition to, or in replacement of tactile feedback to individual fingers;

tactile feedback to the back of the hand or in other locations within the protective suit; and/or more than one tactile actuator per finger.

Even if tactile feedback only is employed (motion tracking and/or finger sensing eliminated), tactile feedback can provide information to the user of protective gloves, such as alerts, warnings, and/or communication notifications.

The addition of tactile sensing on the glove exterior can permit generation of tactile feedback to the user that can enhance their sense of touch during physical contact with the environment. This capability can enhance safety and/or reduce wear-and-tear by reducing required grasp forces. This capability can increase user performance during manual tasks while wearing protective gloves.

Software can enable alternate forms of gesture recognition and/or tactile feedback, such as pinch-type gestures to control the zoom level on a visual display. Software can enable tactile feedback to provide application-specific cues, such as customized communications alerts and/or vibrations that indicate altitude on a relief map.

Certain exemplary embodiments can be used in a protective suit for extra-vehicular (EVA) activity, in a protective suite for intra-vehicular activity (IVA, e.g. within the cockpit of a spacecraft, capsule, or rover), in a pressurized flight suit, in an environmental suit for hazardous operations, and/or in any other application that requires both use of protective gloves and interaction with a mobile communications and/or computing device.

Certain exemplary embodiments can provide remote telerobotic control, using the gloved hand as a master control input to a dexterous manipulator and/or providing tactile feedback to the human of sensed interactions between the remote manipulator and its environment.

Certain exemplary embodiments can provide any of:

Access to operational procedures/checklists (scrolling, selecting, marking);

Human-robot interaction:
  Semi-autonomous, supervisory control through interactive procedures;
  Robot control through hand gestures;
  Tele-manipulation, use gloves to control manipulator on rover, tactile feedback of contact and grip forces;

Geological exploration, survey, sample collection (note taking, cataloguing, annotating images);

Control and/or automation (control/monitor through interaction with graphical displays):
  Core drilling;
  Construction;

Navigation (interaction/control of map display, panning, zooming);

Biometrics and/or suit environmental systems monitoring (tactile alerts/alarms for situation awareness);

Text communications, "chat";

Gestural control of pan/tilt camera on suit;

IVA (intra-vehicular) applications (augment or replace cumbersome context menu driven interfaces):
  Control panels (virtual touch screen using gloves); and/or
  Navigation systems (point and/or click capability with map display)

Figure 21:
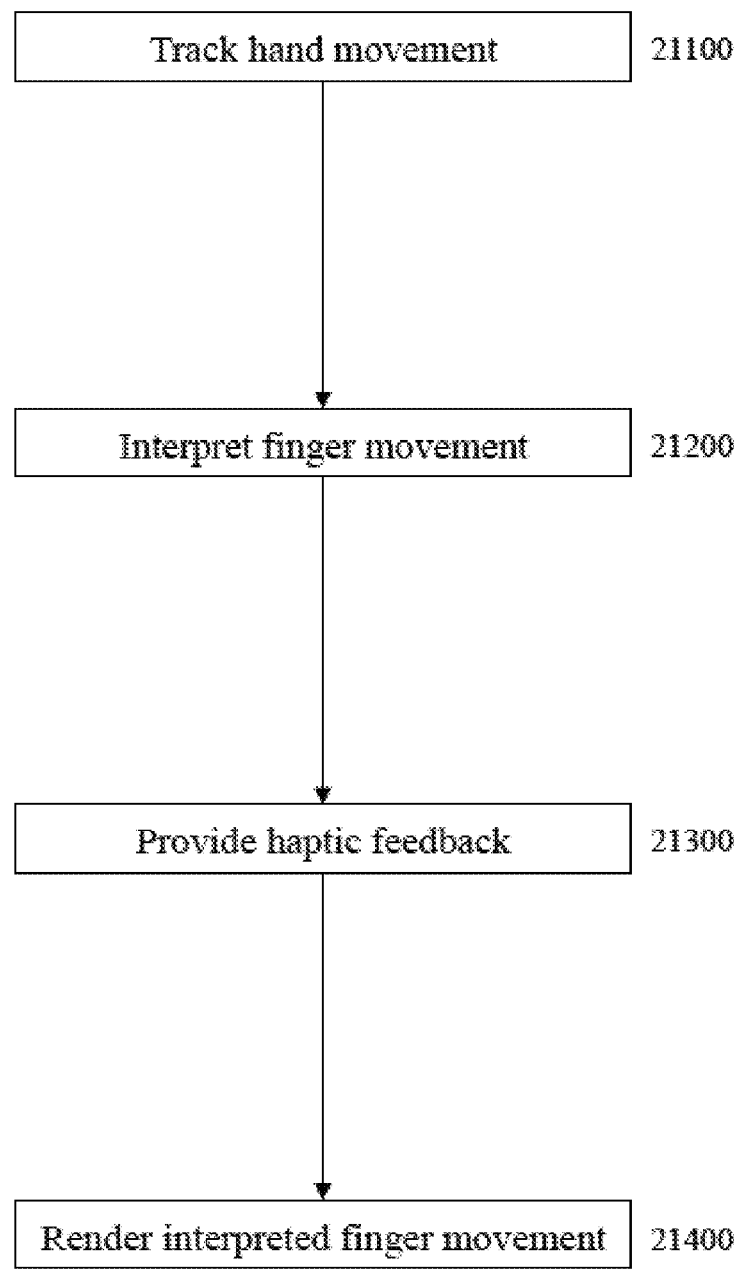
FIG. 21 is a flowchart of an exemplary embodiment of a method.

FIG. 21 is a flowchart of an exemplary embodiment of a method 21000. At activity 21100, movement of a gloved hand of a human can be tracked, the gloved hand wearing a protective glove comprising a sensory output transducer, such as a vibrotactile actuator and/or a tactor. At activity 21200, movement of one or more fingers of the gloved hand can be interpreted, for example, as an actual human finger movement for operating an input device communicatively coupled to in information device. At activity 21300, in response to interpreting the gloved finger movement, via the sensory output transducer, haptic feedback can be provided to the human, such as vibrotactile feedback that simulates the striking of a key of a keyboard, sliding a mouse, rolling a trackball, scrolling a wheel, and/or clicking a button, etc. The haptic feedback can be provided across a protective layer of the glove to the skin of the human. At activity 21400, an output device, such as a display, can render the interpreted finger movement and/or an output corresponding to the interpreted finger movement, such as an entry, positioning, selection, scroll, and/or movement of a key, character, function key, menu, button, text, object, cursor, button, and/or window, etc.

Figure 22:
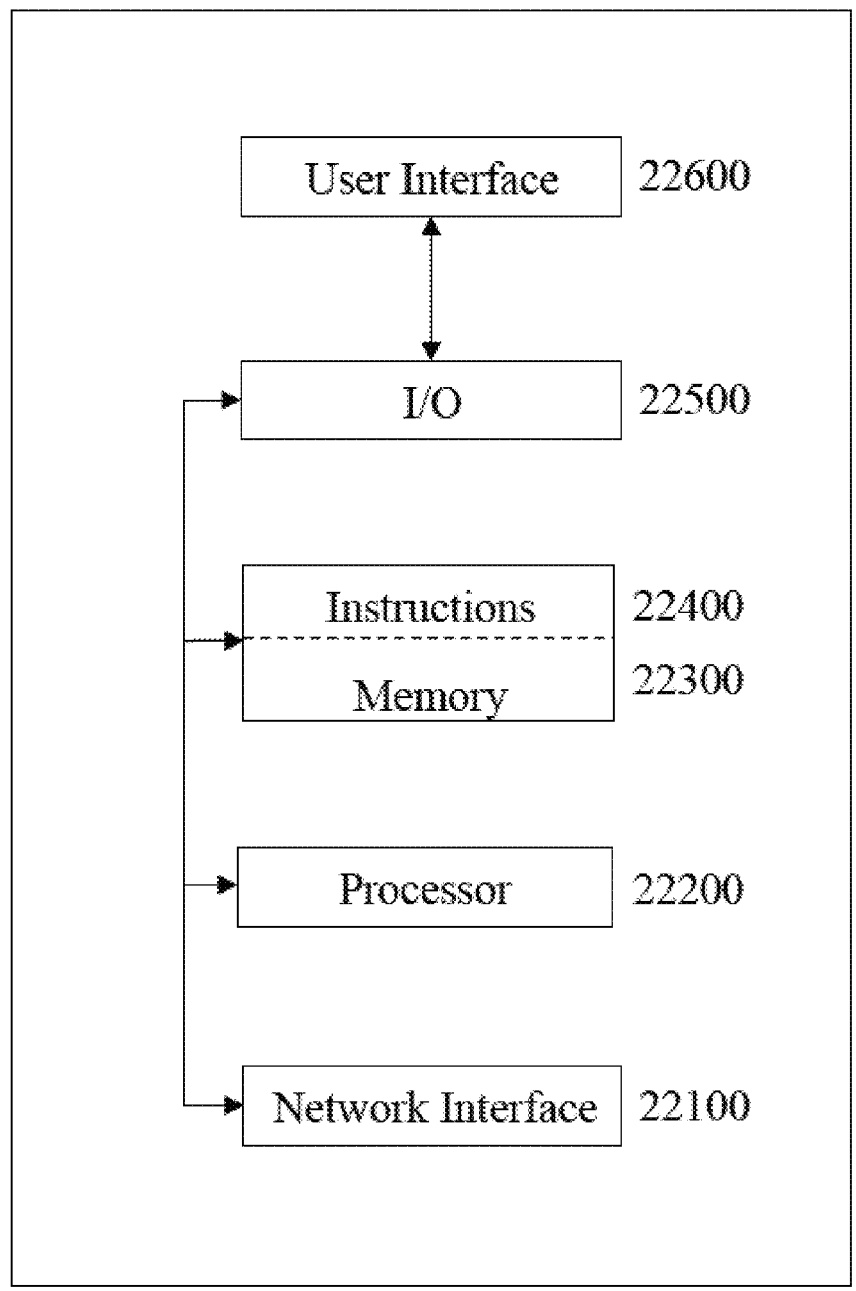
FIG. 22 is a block diagram of an exemplary embodiment of an information device.

FIG. 22 is a block diagram of an exemplary embodiment of an information device 22000, which in certain operative embodiments can comprise, for example, computing system 23 of FIG. 1. Information device 22000 can comprise any of numerous transform circuits, which can be formed via any of numerous communicatively-, electrically-, magnetically-, optically-, fluidically-, and/or mechanically-coupled physical components, such as for example, one or more network interfaces 22100, one or more processors 22200, one or more memories 22300 containing instructions 22400, one or more input/output (I/O) devices 22500, and/or one or more user interfaces 22600 coupled to I/O device 22500, etc.

In certain exemplary embodiments, via one or more user interfaces 22600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Certain exemplary embodiments can provide a method comprising:
  tracking movement of a gloved hand of a human, the gloved hand wearing a protective glove comprising:
    a plurality of layers, the plurality of layers comprising a pressure layer that defines a hand side and an opposing distal side; and/or
    a sensory output transducer located adjacent to the distal side of the pressure layer;
  automatically interpreting an actual gloved finger movement of the human as a predetermined finger movement for operating an input device communicatively coupled to an information device;
  in response to interpreting the actual gloved finger movement, via the sensory output transducer, providing feedback to the human;
  transmitting the feedback though the pressure layer of the protective glove to skin of the human;
  rendering a movement of a cursor on a display, the movement corresponding to the predetermined finger movement;
  rendering a character on a display, the character corresponding to the predetermined finger movement;
  providing the human with a haptic sensation of a position of the gloved hand on a keyboard;
  providing the human with a haptic sensation of striking a key on a keyboard;
  providing the human with a haptic sensation of pressing a button on a computer mouse; and/or
  via a haptic sensation, providing the human with an alert;
  etc.;
  wherein:
    the feedback is provided to at least one finger of the human;
    the protective glove is comprised by a space suit;
    the input device is a pointing device;
    the input device is a character generator; and/or
    the sensory output transducer is a vibrotactile actuator;
    etc.

Certain exemplary embodiments can provide a system comprising:
  a hand movement tracking circuit operatively adapted to track movement of a gloved hand of a human, the gloved hand wearing a protective glove comprising:
    a plurality of layers, the plurality of layers comprising a pressure layer that defines a hand side and an opposing distal side; and/or
    a sensory output transducer adapted to be operatively located adjacent to the distal side of the pressure layer;
  a finger movement interpretation circuit operatively adapted to interpret an actual gloved finger movement of the human as a predetermined finger movement for operating an input device communicatively coupled to an information device; and
  a sensory feedback circuit operatively adapted to, in response to interpreting the actual gloved finger movement, via the sensory output transducer, provide feedback to the human; and/or
  at least one tracking target integrated into the protective glove, the at least one tracking target comprising at least one of a light emitter, a magnet, a radio-frequency coil, and/or a sound emitter;
  etc.;
  wherein:
    the protective glove is a component of a protective suit;
    the protective glove is a component of a space suit;
    the sensory output transducer is a tactile sensory output transducer;
    the sensory output transducer is a tactile actuator;
    the sensory output transducer is a vibrotactile actuator;
    the sensory output transducer is a vibrational actuator mounted on or adjacent to the pressure layer of the protective glove;
    the sensory output transducer is a vibrational actuator mounted in a position operatively adapted to be adjacent to a finger of the protective glove;
    the sensory output transducer is operatively adapted to provide tactile feedback regarding one or more control inputs received by the information system;
    the sensory output transducer is operatively adapted to not interfere with use of the protective glove by the human for grasping or manipulating;
    the sensory output transducer is a resonant actuator comprising at least one of an electromagnetic actuator, a piezoelectric actuator, and/or an electro-active polymer;
    vibrations induced by the sensory output transducer are transported by the pressure layer of the protective glove to skin of the human and provide tactile feedback to the human of one or more control inputs to the information device;
    the hand movement tracking circuit comprises at least one of an optical tracker, a magnetic tracker, a radio-frequency tracker, and/or an acoustic tracker;
    the finger movement interpretation circuit comprises at least one finger motion sensing transducer comprising at least one of a finger flexion sensor, an accelerometer, a magnetic field sensor, an optical sensor, and/or an electromyography sensor;
    the system is operatively adapted to render, on a display communicatively coupled to the information device, at least one of a cursor movement event, a cursor placement event, a clicking event, a dragging event, a scrolling event, a selecting event, and/or a keying event;

the system is operatively adapted to interpret a change in a position of the gloved hand and/or one or more fingers of the gloved hand as corresponding to one or more predetermined key strikes;

the system is operatively adapted to provide the human with a haptic sensation that the gloved hand of the human is utilizing the input device;

the system is operatively adapted to provide the human with a haptic sensation substantially indicating that the gloved hand of the human is utilizing a keyboard; and/or the system is operatively adapted to provide the human with a haptic sensation substantially indicating that the gloved hand of the human is utilizing a computer mouse;

etc.

Certain exemplary embodiments can provide a system comprising:

a protective glove for a hand of a human, the protective glove comprising:

a plurality of layers, the plurality of layers comprising a pressure layer that defines a hand side and an opposing distal side; and/or a sensory output transducer operatively adapted to be located adjacent to the distal side of the pressure layer; and/or a sensory feedback circuit operatively adapted to provide tactile feedback through the pressure layer to the hand of the human;

etc.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.

accelerometer—an instrument for measuring and/or recording acceleration, the rate of acceleration, and/or acceleration force(s) in one or more dimensions.

acoustic—of or relating to sound, the sense of hearing, and/or the science of sound.

activity—an action, act, step, and/or process or portion thereof actual—real, realized, and/or existing; not merely potential or possible; based in reality; and/or measurable.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).

adapted to—suitable, fit, and/or capable of performing a specified function.

adapter—a device used to effect operative compatibility between different parts of one or more pieces of an apparatus or system.

adjacent—close to; lying near; next to; adjoining, and/or within a horizontal radius of approximately 0 to approximately 0.2 inches of, including all values and subranges therebetween.

alert—information and/or a signal that is adapted to warn and/or notify.

an—at least one.

and/or—either in conjunction with or in alternative to.

apparatus—an appliance or device for a particular purpose are—to exist.

associate—to join, connect together, and/or relate.

at least one—not less than one, and possibly more than one.

automatic—performed via an information device in a manner essentially independent of influence and/or control by a user. For example, an automatic light switch can turn on upon "seeing" a person in its "view", without the person manually operating the light switch.

barrier—a structure and/or element that impedes and/or obstructs free movement.

be—to exist in actuality.

bladder—a hollow and/or inflated sac-like structure.

Boolean logic—a complete system for logical operations.

can—is capable of, in at least some embodiments.

cause—to bring about, provoke, precipitate, produce, elicit, be the reason for, result in, and/or effect.

change—(v.) to cause to be different; (n.) the act, process, and/or result of altering and/or modifying.

character—a symbol, number, letter, and/or punctuation mark, etc., that represents data interpretable by an information device.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

click—to press down and/or release a button on a pointing device, such as a mouse.

coil—(n) a continuous loop comprising one or more turns of electrically conductive material and/or a conductor that creates a magnetic field due to the flow of current therein, the conductor formed into one or more convolutions or turns, or having only a partial turn, or being straight; (v) to roll and/or form into a configuration having a substantially spiraled cross-section.

communicatively—linking in a manner that facilitates communications.

component—a constituent element and/or part.

comprising—including but not limited to.

computer mouse—a hand-held, button-activated input device that when rolled along a flat surface directs an indicator to move correspondingly about a display, allowing the operator to move the indicator freely, as to select operations and/or manipulate text and/or graphics.

configure—to make suitable or fit for a specific use or situation.

connect—to join or fasten together.

containing—including but not limited to.

control—(n) a mechanical or electronic device used to operate a machine within predetermined limits; (v) to exercise authoritative and/or dominating influence over, cause to act in a predetermined manner, direct, adjust to a requirement, and/or regulate.

convert—to transform, adapt, and/or change.

corresponding—related, associated, accompanying, similar in purpose and/or position, conforming in every respect, and/or equivalent and/or agreeing in amount, quantity, magnitude, quality, and/or degree.

couple—to join, connect, and/or link by any known way, including mechanical, fluidic, acoustic, electrical, magnetic, optical, etc.

create—to bring into being.

cursor—a pointer and/or position indicator associated with a rendering.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of.

determine—to find out, obtain, calculate, decide, deduce, ascertain, and/or come to a decision, typically by investigation, reasoning, and/or calculation.

device—a machine, manufacture, and/or collection thereof digital—non-analog and/or discrete.

display—(v.) to render and/or make perceptible to human sensory means. (n.) an electronic device that renders information such that it can be perceived and/or interpreted through human sensory means.

distal—remote from another with respect to some physical point of reference or origin (for example, with respect to the elbow, the hand is located beyond the distal end of the forearm).

drag—to move a pointing device while pressing down on one of its buttons.

electroactive—describing any material (especially in a cell) that is electrically active and/or responsive and/or describing any polymer that changes shape in the presence of an electric field.

electromyography—the sensing of the electrical activity of a skeletal muscle by means of an electrode inserted into the muscle or placed on the skin.

emit—to give and/or send out.

estimate—(n) a calculated value approximating an actual value; (v) to calculate and/or determine approximately and/or tentatively.

event—an occurrence and/or happening.

feedback—the return of information about the result of a process or activity.

finger—one of the five digits of the hand, including the thumb.

flexion—the bending a joint or limb in the body.

for—with a purpose of.

gas—a substance (for example air) that has neither independent shape nor volume but tends to expand to fill the space it is in.

generate—to create, produce, give rise to, and/or bring into existence.

gesture—a movement and/or position of at least one of a finger, hand, limb, body, head, and/or face, etc., that conveys information and/or is expressive of an idea, intent, opinion, sentiment, emotion, and/or attitude, etc.

glove—a fitted covering for the hand with a separate sheath for each finger.

gloved—wearing a glove.

grasp—to take hold of or seize firmly with or as if with the hand.

hand—the terminal part of the human arm located below the forearm, used for grasping and holding and comprising the wrist, palm, four fingers, and an opposable thumb.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of passive touch (being touched), active touch, grasping, pressure, friction, traction, slip, friction, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

human—a member of, or substantially resembling a member of, the genus *Homo* and especially of the species *H. sapiens*.

human-machine interface—hardware and/or software adapted to render information to a user and/or receive information from the user; and/or a user interface.

impermeable—not permeable.

including—including but not limited to.

induce—to bring about or cause to occur.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device capable of processing data and/or information, such as any general purpose and/or special purpose computer, such as a personal computer, workstation, server, minicomputer, mainframe, supercomputer, computer terminal, laptop, tablet computer (such as an iPad-like device), wearable computer, Personal Digital Assistant (PDA), mobile terminal, Bluetooth device, communicator, "smart" phone (such as an iPhone-like device), messaging service (e.g., Blackberry) receiver, pager, facsimile, cellular telephone, traditional telephone, telephonic device, embedded controller, programmed microprocessor or microcontroller and/or peripheral integrated circuit elements, ASIC or other integrated circuit, hardware electronic logic circuit such as a discrete element circuit, and/or programmable logic device such as a PLD, PLA, FPGA, or PAL, or the like, etc. In general, any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc. In information device can be a component of and/or augment another device, such as an appliance, machine, tool, robot, vehicle, television, printer, "smart" utility meter, etc.

initialize—to prepare something for use and/or some future event.

inner—closer than another to the center and/or middle.

input—a signal, data, and/or information provided to a processor, device, and/or system.

input device—any device adapted to provide input to an information device. Examples can include, for example, a keyboard, keypad, mouse, trackball, joystick, gamepad, wheel, touchpad, touch panel, pointing device, microphone, video camera, camera, and/or scanner, potentially including a port to which an input device can be operatively attached or connected.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect and/or set in position and/or prepare for use.

instructions—directions, which can be implemented as hardware, firmware, and/or software, the directions adapted to perform a particular operation and/or function via creation and/or maintenance of a predetermined physical circuit.

integrated—formed or united into a whole or into another entity.

interfere—to obstruct and/or impede.

interpret—to make sense of and/or assign a meaning to.

into—to a condition, state, or form of; toward; in the direction of, and/or to the inside of.

is—to exist in actuality.

key—(n.) a keyboard element that can be struck to cause a corresponding character or function to be accepted as input by an information device; (v.) to strike a key of a keyboard.

keyboard—a data input device for an information system, the device having a set of keys having a general arrangement modeled after the keys of a typewriter.

layer—a single thickness of a material covering a surface and/or forming an overlying part and/or segment; a ply, strata, and/or sheet.

light—electromagnetic radiation having a wavelength within a range of approximately 300 nanometers to approximately 1000 nanometers, including any and all values and subranges therebetween.

locate—to situate, place, and/or find in approximately in a particular spot, region, and/or position.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-piano scroll, etc.

magnet—an object that is surrounded by a magnetic field and that has the property, either natural or induced, of attracting iron and/or steel.

magnetic—having the property of attracting iron and certain other materials by virtue of a surrounding field of force.

magnetic field—the portion of space near a magnetic body or a current-carrying body in which the magnetic forces due to the body or current can be detected.

manipulate—to move, arrange, operate, or control by or as if by the hands and/or by mechanical means.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

more—a quantifier meaning greater in size, amount, extent, and/or degree.

motion—movement due to rotation and/or translation.

motor—a machine adapted to convert energy and/or signals into mechanical motion.

mount—to couple, fix, and/or attach on and/or to something.

move—to change position and/or transfer from one location to another.

movement—a change in position from one location to another.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

not—a negation of something.

operating—arising out of normal and/or functional operations of an entity.

operatively—in a manner able to function and/or to work.

optical—of or relating to light, sight, and/or a visual representation.

outer—farther than another from the center and/or middle.

output—(n) something produced and/or generated; data produced by an information device executing machine-readable instructions; and/or the energy, power, work, signal, and/or information produced by a system. (v) to provide, produce, manufacture, and/or generate.

packet—a generic term for a bundle of data organized in a specific way for transmission, such as within and/or across a network, such as a digital packet-switching network, and comprising the data to be transmitted and certain control information, such as a destination address.

perceptible—capable of being perceived by the human senses.

permeability—the ability of a membrane or other material to permit a substance to pass through it.

phalanx—any of the bones of the fingers or toes.

physical—tangible, real, and/or actual.

physically—existing, happening, occurring, acting, and/or operating in a manner that is tangible, real, and/or actual.

piezoelectric—the generation of electricity or of electric polarity in dielectric crystals subjected to mechanical stress, and/or the generation of stress in such crystals subjected to an applied voltage.

placement—a location at which something is positioned.
plurality—the state of being plural and/or more than one.
point—(v.) to indicate a position and/or direction of.
polymer—a chemical compound and/or mixture of compounds formed by polymerization (a chemical reaction in which two or more molecules (often called "monomers") combine via covalent chemical bonds to form larger molecules that contain repeating structural units). Examples of polymers include ABS's, polyacetates, polyacrylics, alkyds, epoxies, flourothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc.
position—(n) a place and/or location, often relative to a reference point. (v) to place, put, and/or locate.
predetermined—determined, decided, obtained, calculated, and/or established in advance.
pressure—a measure of force applied uniformly over a surface.
pressure layer—a layer comprising one or more materials operatively adapted to be substantially gas-impermeable.
pressure suit—a suit operatively adapted to be pressurized and/or for wear in a vacuum and/or at low ambient pressures.
pressurize (tr.v. pressurized)—to maintain a differential pressure on a material. For example, a substantially impermeable material may become pressurized when the pressure (exerted by any combination of gasses, liquids, or solids) on one side of the material exceeds the pressure (exerted by any combination of gasses, liquids, or solids) on the other side of the material (which may be zero in the case of a vacuum).
probability—a quantitative representation of a likelihood of an occurrence.
processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.
project—(v) to calculate, estimate, or predict.
protective—adapted to provide protection.
provide—to furnish, supply, give, convey, send, and/or make available.
radio-frequency—a frequency of electromagnetic radiation in the range at which radio signals are transmitted, ranging from approximately 3 kilohertz to approximately 300 gigahertz.
receive—to get as a signal, gather, take, acquire, obtain, accept, get, and/or have bestowed upon.
recommend—to suggest, praise, commend, and/or endorse.
regarding—pertaining to.
render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.
repeatedly—again and again; repetitively.
request—to express a desire for and/or ask for.
resonant—resulting from or as if from resonance, which is the increase in amplitude of oscillation of an electric and/or mechanical system exposed to a periodic force whose frequency is equal or very close to the natural undamped frequency of the system.
response—a reaction, reply, and/or answer to an influence and/or impetus.
scroll—to cause displayed text and/or graphics to move up, down, and/or across the screen.
select—to make and/or indicate a choice and/or selection from among alternatives.
sensation—a perception associated with stimulation of one or more sense organ.
sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, magnetic flux, and/or electro-magnetic radiation, etc.) and convert that physical quantity into a signal. Examples include position sensors, proximity switches, stain gages, photo sensors, thermocouples, level indicating devices, speed sensors, accelerometers, electrical voltage indicators, electrical current indicators, on/off indicators, and/or flowmeters, etc.
sensory—of or relating to the senses or sensation.
server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

skin—the membranous tissue forming the external covering of an animal and comprising in vertebrates the epidermis and dermis.

sound—a sensation produced by stimulation of the organs of hearing by vibrations transmitted through the air and/or other medium.

space suit—A protective suit adapted for wear by humans at high altitudes, outside of the Earth's atmosphere, and/or at low atmospheric pressures. A space suit can comprise a pressure suit and any number of protective layers that can provide a measure of protection from environmental hazards that can include low atmospheric pressure, low partial pressure of oxygen, toxic compounds, thermal extremes, micrometeoroid impact, electromagnetic radiation, electric shock, charged particles, punctures, and/or cuts, etc.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

store—to place, hold, and/or retain data, typically in a memory.

strike—to depress, press, tap, click, actuate, and/or operate.

structure—a device.

substantially—to a considerable, large, and/or great, but not necessarily whole and/or entire, extent and/or degree.

substantially—to a great extent and/or degree.

support—to bear the weight of, especially from below.

switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

system—a collection of mechanisms, devices, machines, articles of manufacture, processes, data, and/or instructions, the collection designed to perform one or more specific functions.

tactile—perceptible to the sense of touch and/or able to be felt via the fingertip.

tactile-feedback—information perceptible to the sense of touch and based on force, pressure, vibration, motion, skin stretch, displacement, gap, recess, texture, friction, and/or temperature, etc.

target—a thing to be tracked, followed, and/or monitored.

that—a pronoun used to indicate a thing as indicated, mentioned before, present, and/or well known.

through—in one side and out the opposite and/or another side of.

to—a preposition adapted for use for expressing purpose.

track—to follow, observe, and/or monitor the course of transducer—a device that converts one form of energy into another. For example, a sensing optical fiber can convert changes in mechanical energy, such as a perturbation of the fiber, to changes in optical energy.

transform—to change in measurable: form, appearance, nature, and/or character.

transmit—to provide, furnish, supply, send as a signal, and/or to convey (e.g., force, energy, and/or information) from one place and/or thing to another.

transport—to carry, convey, and/or move.

use—to put into service, utilize, make work, and/or employ for a particular purpose and/or for its inherent and/or natural purpose.

user interface—any device for rendering information to a user and/or receiving information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

via—by way of and/or utilizing.

vibrate—to move back and forth or to and fro, especially rhythmically and/or rapidly.

vibrotactile—of, pertaining to, or using vibrotaction.

vibrotaction—the response of human sensory organs (e.g. mechanorecptors) to varying forces on the skin and/or to oscillatory motion of the skin.

wear—to don, carry, and/or have on the person as covering, adornment, and/or protection.

weight—a value indicative of importance.

wherein—in regard to which; and; and/or in addition to.

with—accompanied by.

within—inside the limits of.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method comprising:
tracking movement of a gloved hand of a human relative to a predetermined reference point, the gloved hand wearing a protective glove comprising:
a plurality of layers, the plurality of layers comprising a pressure layer that defines a hand side and an opposing distal side, wherein, when in operation, a gas that is disposed on the hand side of the pressure layer is maintained at a gas pressure that creates a predetermined pressure differential with respect to an ambient pressure exerted on the distal side, the pressure differential sufficient to substantially stiffen the pressure layer; and
a sensory output transducer operatively located adjacent to, and mechanically coupled to, the distal side of the pressure layer;
automatically interpreting an actual gloved finger movement of the human relative to the gloved hand as a predetermined finger movement for operating an input device communicatively coupled to an information device, the interpreting of the actual gloved finger movement distinct from the tracking of the movement of the gloved hand; and
in response to interpreting the actual gloved finger movement, via the sensory output transducer and across the substantially stiffened pressure layer, automatically providing feedback to the human.

2. The method of claim 1, further comprising:
transmitting the feedback though the pressure layer of the protective glove to skin of the human.

3. The method of claim 1, further comprising:
rendering a movement of a cursor on a display, the movement corresponding to the predetermined finger movement.

4. The method of claim 1, further comprising:
rendering a character on a display, the character corresponding to the predetermined finger movement.

5. The method of claim 1, further comprising:
providing the human with a haptic sensation of a position of the gloved hand on a keyboard.

6. The method of claim 1, further comprising:
providing the human with a haptic sensation of striking a key on a keyboard.

7. The method of claim 1, further comprising:
providing the human with a haptic sensation of pressing a button on a computer mouse.

8. The method of claim 1, further comprising:
via a haptic sensation, providing the human with an alert.

9. The method of claim 1, wherein:
the feedback is provided to at least one finger of the human.

10. The method of claim 1, wherein:
the protective glove is comprised by a space suit.

11. The method of claim 1, wherein:
the input device is a pointing device.

12. The method of claim 1, wherein:
the input device is a character generator.

13. The method of claim 1, wherein:
the sensory output transducer is a vibrotactile actuator.

14. A system comprising:
a hand movement tracking circuit operatively configured to track movement of a gloved hand of a human relative to a predetermined reference point, the gloved hand wearing a protective glove comprising:
a plurality of layers, the plurality of layers comprising a pressure layer that defines a hand side and an opposing distal side, wherein, when in operation, a gas that is disposed on the hand side of the pressure layer is maintained at a gas pressure that creates a predetermined pressure differential with respect to an ambient pressure exerted on the distal side, the pressure differential sufficient to substantially stiffen the pressure layer; and
a sensory output transducer configured to be operatively located adjacent to, and mechanically coupled to, the distal side of the pressure layer;

a finger movement interpretation circuit operatively configured to interpret an actual gloved finger movement of the human relative to the gloved hand as a predetermined finger movement for operating an input device communicatively coupled to an information device, the finger movement interpretation circuit distinct from the hand movement tracking circuit; and a sensory feedback circuit operatively configured to, in response to interpreting the actual gloved finger movement, via the sensory output transducer and across the substantially stiffened pressure layer, provide feedback to the human.

15. The system of claim 14, wherein:
the protective glove is a component of a protective suit.

16. The system of claim 14, wherein:
the protective glove is a component of a space suit.

17. The system of claim 14, wherein:
the sensory output transducer is a tactile sensory output transducer.

18. The system of claim 14, wherein:
the sensory output transducer is a tactile actuator.

19. The system of claim 14, wherein:
the sensory output transducer is a vibrotactile actuator.

20. The system of claim 14, wherein:
the sensory output transducer is a vibrational actuator mounted on or adjacent to the pressure layer of the protective glove.

21. The system of claim 14, wherein:
the sensory output transducer is a vibrational actuator mounted in a position operatively configured to be adjacent to a finger of the protective glove.

22. The system of claim 14, wherein:
the sensory output transducer is operatively configured to provide tactile feedback regarding one or more control inputs received by the information system.

23. The system of claim 14, wherein:
the sensory output transducer is operatively configured to not interfere with use of the protective glove by the human for grasping or manipulating.

24. The system of claim 14, wherein:
the sensory output transducer is a resonant actuator comprising at least one of an electromagnetic actuator, a piezoelectric actuator, and an electro-active polymer.

25. The system of claim 14, wherein:
vibrations induced by the sensory output transducer are transported by the pressure layer of the protective glove to skin of the human and provide tactile feedback to the human of one or more control inputs to the information device.

26. The system of claim 14, wherein:
the hand movement tracking circuit comprises at least one of an optical tracker, a magnetic tracker, a radio-frequency tracker, and an acoustic tracker.

27. The system of claim 14, wherein:
the finger movement interpretation circuit comprises at least one finger motion sensing transducer comprising at least one of a finger flexion sensor, an accelerometer, a magnetic field sensor, an optical sensor, and an electromyography sensor.

28. The system of claim 14, wherein:
the system is operatively configured to render, on a display communicatively coupled to the information device, at least one of a cursor movement event, a cursor placement event, a clicking event, a dragging event, a scrolling event, a selecting event, and a keying event.

29. The system of claim 14, further comprising:
at least one tracking target integrated into the protective glove, the at least one tracking target comprising at least one of a light emitter, a magnet, a radio-frequency coil, and a sound emitter.

30. The system of claim 14, wherein:
the system is operatively configured to interpret a change in a position of the gloved hand, and/or a position of one or more fingers of the gloved hand, as corresponding to one or more predetermined key strikes.

31. The system of claim 14, wherein:
the system is operatively configured to provide the human with a haptic sensation that the gloved hand of the human is utilizing the input device.

32. The system of claim 14, wherein:
the system is operatively configured to provide the human with a haptic sensation substantially indicating that the gloved hand of the human is utilizing a keyboard.

33. The system of claim 14, wherein:
the system is operatively configured to provide the human with a haptic sensation substantially indicating that the gloved hand of the human is utilizing a computer mouse.

34. A system comprising:
a protective glove for a hand of a human, the protective glove comprising:
a plurality of layers, each of the plurality of layers operatively configured to substantially surround the hand, the plurality of layers comprising a pressure layer that defines a hand side and an opposing distal side, wherein, when in operation, a gas that is disposed on the hand side of the pressure layer is maintained at a gas pressure that creates a predetermined pressure differential with respect to an ambient pressure exerted on the distal side, the pressure differential sufficient to substantially stiffen the pressure layer; and
a sensory output transducer configured to be operatively located adjacent to, and mechanically coupled to, the distal side of the pressure layer; and
a sensory feedback circuit operatively configured to provide tactile feedback through the substantially stiffened pressure layer to the hand of the human, the tactile feedback operatively configured to simulate a control input received by and for an information system communicatively coupled to the protective glove.

* * * * *